United States Patent [19]
Werner et al.

[11] Patent Number: 6,075,816
[45] Date of Patent: Jun. 13, 2000

[54] WINDOWING TECHNIQUE FOR BLIND EQUALIZATION

[75] Inventors: Jean-Jacques Werner, Holmdel; Jian Yang, Cliffwood, both of N.J.

[73] Assignee: Lucent Technologies, Inc., Murray Hill, N.J.

[21] Appl. No.: 08/757,207

[22] Filed: Nov. 27, 1996

[51] Int. Cl.[7] ............................................... H03N 7/30
[52] U.S. Cl. ........................ 375/229; 375/232; 364/724.2
[58] Field of Search ............................ 364/724.2, 724.16, 364/724.19; 375/230–235, 229

[56] References Cited

U.S. PATENT DOCUMENTS

| | | | |
|---|---|---|---|
| 4,894,847 | 1/1990 | Tjahjadi et al. ........................ | 375/121 |
| 5,157,690 | 10/1992 | Buttle ....................................... | 375/232 |
| 5,195,106 | 3/1993 | Kazecki et al. ........................... | 375/230 |
| 5,303,263 | 4/1994 | Shoji et al. .............................. | 375/229 |
| 5,414,732 | 5/1995 | Kaufmann ................................ | 375/232 |
| 5,506,871 | 4/1996 | Hwang et al. ........................... | 375/230 |
| 5,654,765 | 8/1997 | Kim ........................................ | 348/614 |

*Primary Examiner*—Stephen Chin
*Assistant Examiner*—Chieh M. Fan
*Attorney, Agent, or Firm*—J. J. Opalach

[57] ABSTRACT

A blind convergence technique is restricted to using a subset of equalizer output samples. Illustratively, a receiver implements a windowed MMA approach. In this windowed MMA approach, a sample window overlays the two-dimensional plane representing the set of equalizer output samples. Only those equalizer output samples appearing within the sample window are used during filter adaptation.

17 Claims, 14 Drawing Sheets

PHASE-SPLITTING FSLE

UNEQUALIZED SIGNAL CONSTELLATION

START OF MMA

MODULI FOR IN-PHASE DIMENSION

MODULI FOR QUADRATURE PHASE DIMENSION

MODULI FOR BOTH DIMENSIONS

AFTER CONVERGENCE WITH MMA

AFTER CONVERGENCE WITH 64-POINT SLICER

| MAIN CHARACTERISTICS OF THEM BLIND EQUALIZATION ALGORITHMS | | | |
|---|---|---|---|
| ALGORITHM | RELIABILITY | COMPLEXITY | SPEED OF CONVERGENCE |
| RCA | LOW | LOW | SECOND FASTEST |
| MMA | HIGH | MEDIUM | FASTEST |
| CMA | VERY HIGH | HIGH | SLOWEST |

*FIG. 19*

| VALUES OF THE CONSTANTS R, $R_1$ AND $R_2$ FOR SYMBOL LEVELS ±1, ±3, ±5, ±7, ... | | | | | | | |
|---|---|---|---|---|---|---|---|
| ALGORITHM | 4-CAP | 16-CAP | 32-CAP | 64-CAP | 128-CAP | 256-CAP | 512-CAP |
| RCA | 1 | 2.50 | 3.64 | 5.25 | 7.45 | 10.625 | 15.00 |
| MMA | 1 | 2.86 | 4.32 | 6.08 | 8.88 | 12.34 | 17.87 |
| CMA | 1.414 | 3.633 | 5.11 | 7.616 | 10.49 | 15.39 | 21.11 |
| MMA $R_1$ | -- | -- | 4.49 | -- | 9.22 | -- | 18.55 |
| MMA $R_2$ | -- | -- | 2.86 | -- | 6.08 | -- | 12.34 |

DIAGONAL SOLUTION FOR 64-CAP

| CONSTANT/CAP | 16CAP | 64CAP | 256CAP | 1024CAP |
|---|---|---|---|---|
| m | 2 | 4 | 8 | 16 |
| R | 2.86 | 6.08 | 12.34 | 24.76 |
| $m_W$ | 1 | 2 | 4 | 8 |
| $R_W$ | 3 | 6.4 | 12.97 | 26.05 |

| COST FUNCTION/CAP | 16CAP | 64CAP | 256CAP | 1024CAP |
|---|---|---|---|---|
| m | 2 | 4 | 8 | 16 |
| $CF_{mma}$ (dB) | 14.2 | 27.7 | 40 | 52 |
| $CF_{wmma}$ (dB) | 0 | 22 | 35 | 47 |
| $\Delta CF$ | 14.2 | 5.7 | 5 | 5 |

AFTER CONVERGENCE WITH LMS ALGORITHM

AFTER CONVERGENCE WITH HALF-CONSTELLATION WMMA

AFTER CONVERGENCE WITH EDGE-POINT WMMA

WINDOWING TECHNIQUE FOR BLIND EQUALIZATION

CROSS-REFERENCE TO RELATED APPLICATION

Related subject matter is disclosed in the following co-pending, commonly assigned, U.S. Patent applications of Werner et al.: Ser. No. 08/646,404, filed on May 7, 1996; Ser. No. 08/717,582, filed on Sep. 18, 1996; and Ser. No. 08/744,908 filed on Nov. 8, 1996.

BACKGROUND OF THE INVENTION

The present invention relates to communications equipment, and, more particularly, to blind equalization in a receiver.

In blind equalization, the equalizer of a receiver is converged without the use of a training signal. As known in the art, there are two techniques for blind equalization: one is referred to herein as the "reduced constellation algorithm" (RCA) (e.g., see Y. Sato, "A Method of Self-Recovering Equalization for Multilevel Amplitude-Modulation Systems," *IEEE Trans. Commun.*, pp. 679–682, June 1975; and U.S. Pat. No. 4,227,152, issued Oct. 7, 1980 to Godard); and the other technique is the so-called "constant modulus algorithm" (CMA) (e.g., see D. N. Godard, "Self-Recovering Equalization and Carrier Tracking in Two-Dimensional Data Communications Systems," *IEEE Trans. Commun.*, vol. 28, no. 11, pp. 1867–1875, November 1980; and N. K. Jablon, "Joint Blind Equalization, Carrier Recovery, and Timing Recovery for High-Order QAM Signal Constellations", *IEEE Trans. Signal Processing*, vol. 40, no. 6, pp. 1383–1398, 1992.) Further, the co-pending, commonly assigned, U.S. Patent application of Werner et al., entitled "Blind Equalization," Ser. No. 08/646,404, filed on May 7, 1996, presents an new blind equalization technique—the multimodulus algorithm (MMA)—as an alternative to the above-mentioned RCA and CMA approaches.

Unfortunately, whether using the RCA, CMA, or MMA, approaches, the ability to blindly converge the equalizer is also affected by the number of symbol levels represented in the signal point constellation. In other words, the difficulty of "opening the eye" (as this term is used in the art) increases when the number of symbol levels increases.

SUMMARY OF THE INVENTION

Any blind convergence technique is affected by the distribution of the output signals, or samples, of the equalizer. As such, an increase in the number of symbol levels increases the distribution of the equalizer output samples, which, in turn, makes it more difficult to blindly converge the equalizer. Therefore, and in accordance with the inventive concept, a blind convergence technique is restricted to using a subset of the equalizer output samples. This improves the ability to blindly converge the equalizer notwithstanding an increase in symbol levels.

In an embodiment of the invention, a receiver implements a windowed MMA approach. In this windowed MMA approach, a sample window overlays the two-dimensional plane representing the set of equalizer output samples. Only those equalizer output samples appearing within the sample window are used during filter adaptation. Two different variations of the windowed MMA approach are described.

BRIEF DESCRIPTION OF THE DRAWING

FIG. 19 shows a table of illustrative data values for use in the RCA, CMA, and MMA, blind equalization methods;

DETAILED DESCRIPTION

Figure 1:
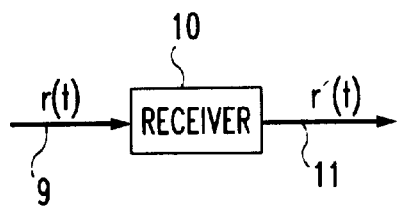
FIG. 1 is an illustrative block diagram of a portion of a communications system embodying the principles of the invention.

An illustrative high-level block diagram of a portion of a communications system embodying the principles of the invention is shown in FIG. 1. For illustrative purposes only, it is assumed that receiver 10 receives a CAP (carrierless, amplitude modulation, phase modulation) signal, which can be represented by:

$$r(t)=\Sigma_n[a_n p(t-nT)-b_n \tilde{p}(t-nT)]+\xi(t) \tag{1}$$

where $a_n$ and $b_n$ are discrete-valued multilevel symbols, p(t) and $\tilde{p}$(t) are impulse responses which form a Hilbert pair, T is the symbol period, and $\xi$(t) is additive noise introduced in the channel.

It is assumed that the CAP signal in equation (1) has been distorted while propagating through communications channel 9 and experiences intersymbol interference (ISI). This ISI consists of intrachannel ISI ($a_n$ or $b_n$ symbols interfering with each other) and interchannel ISI ($a_n$ and $b_n$ symbols interfering with each other). The purpose of receiver 10 is to remove the ISI and minimize the effect of the additive noise $\xi$(t) to provide signal r'(t). The inventive concept will illustratively be described in the context of a windowed MMA blind equalization algorithm for use within receiver 10. However, before describing the inventive concept, some background information on adaptive filters and the above-mentioned RCA, CMA, and MMA algorithms is presented. Also, as used herein, an adaptive filter is, e.g., a fractionally spaced linear equalizer, which is hereafter simply referred to as an FSLE equalizer or, simply, an equalizer.

Equalizer Structures

Figure 2:
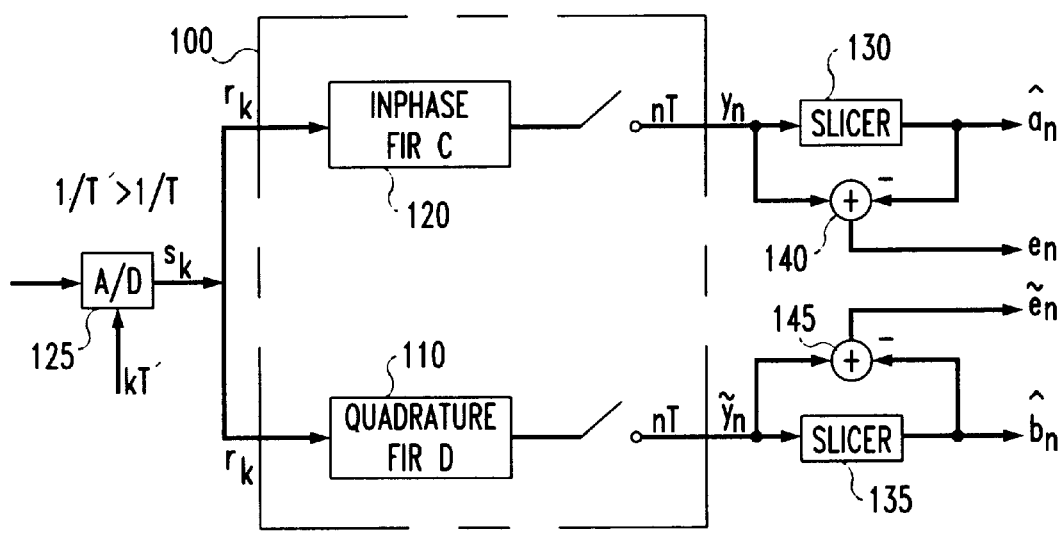
FIG. 2 is an illustrative block diagram of a phase-splitting equalizer.
Figure 3:
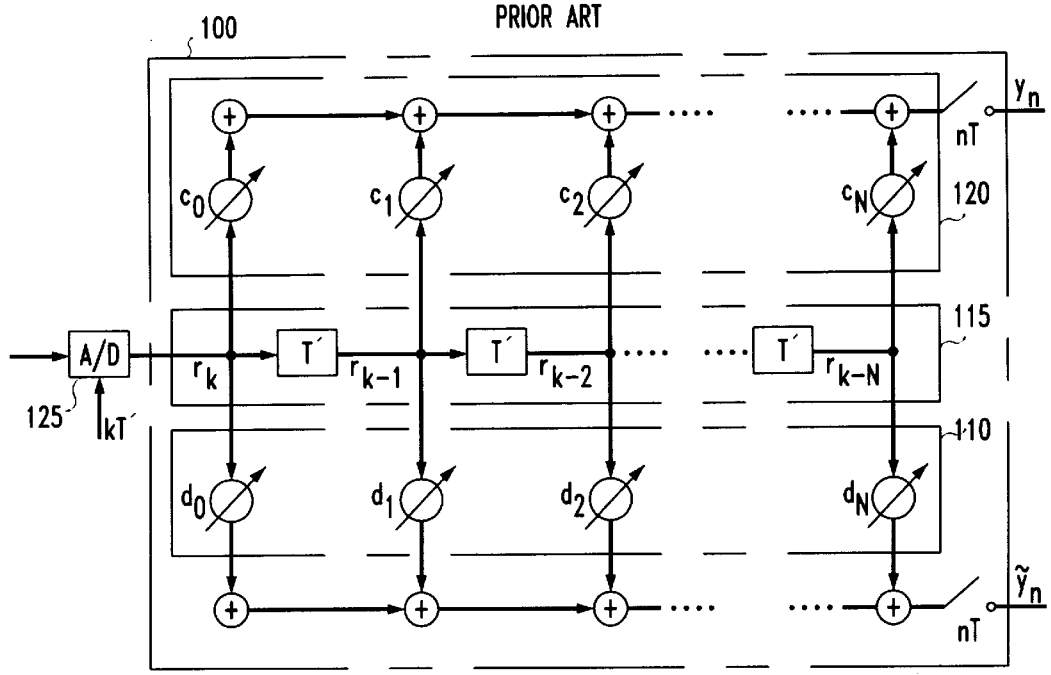
FIG. 3 is an illustrative block diagram of a portion of an adaptive filter for use in an equalizer.

An illustrative phase-splitting FSLE equalizer 100 is shown in FIG. 2. It is assumed that FSLE equalizer 100 operates on an input signal comprising two dimensions: an in-phase component and a quadrature component. FSLE equalizer 100 comprises two parallel digital adaptive filters implemented as finite impulse response (FIR) filters 110 and 120. Equalizer 100 is called a "phase-splitting FSLE" because the two FIR filters 110 and 120 converge to in-phase and quadrature filters. Some illustrative details of the equalizer structure are shown in FIG. 3. The two FIR filters 110 and 120 share the same tapped delay line 115, which stores sequences of successive Analog-to-Digital Converter (A/D) 125 samples $r_k$. The sampling rate 1/T' of A/D 125 is typically three to four times higher than the symbol rate 1/T and is chosen in such a way that it satisfies the sampling theorem for real signals. It is assumed that T/T'=i, where i is an integer.

The outputs of the two adaptive FIR filters 110 and 120 as shown in FIG. 3 are computed at the symbol rate 1/T. The equalizer taps and input samples can be represented by a corresponding N-dimensional vector. As such, the following relationships are now defined:

$r_n^T=[r_k, r_{k-1}, \ldots, r_{k-N}]$=vector of A/D samples in delay line; (2)

$c_n^T=[c_0, c_1, c_2, \ldots, c_N]$=vector of in-phase tap coefficients; and (3)

$d_n^T=[d_0, d_1, d_2, \ldots, d_N]$=vector of quadrature phase tap coefficients; (4)

where the superscript T denotes vector transpose, the subscript n refers to the symbol period nT, and k=in.

Let $y_n$ and $\tilde{y}_n$ be the computed outputs of the in-phase and quadrature filters, respectively, and:

$$y_n=c_n^T r_n; \text{ and} \tag{5}$$

$$\tilde{y}_n=d_n^T r_n. \tag{6}$$

Figure 6:
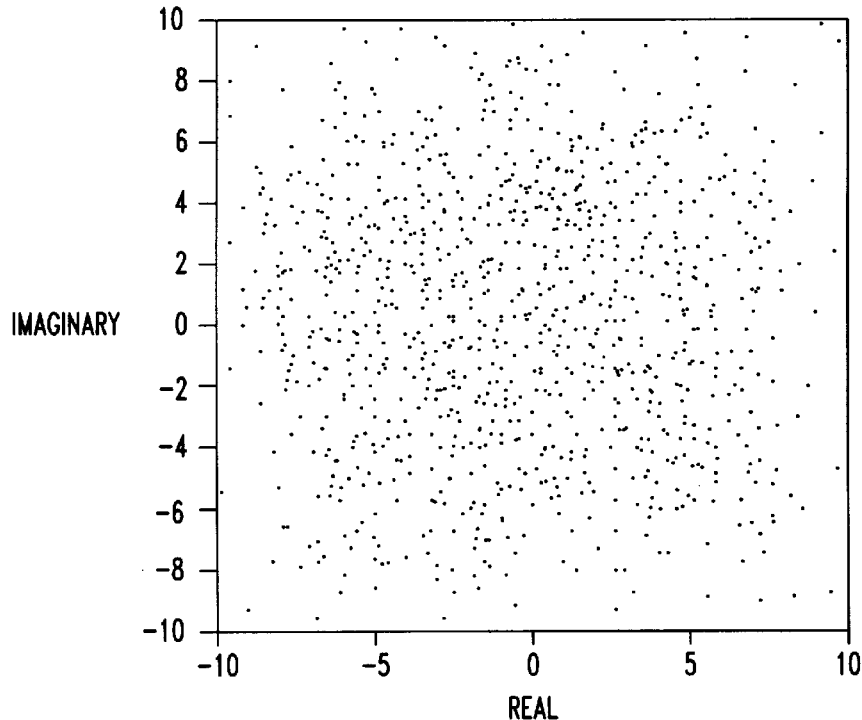
FIG. 6 is an illustrative signal point plot of an output signal of an equalizer before convergence.
Figures 17, 18:
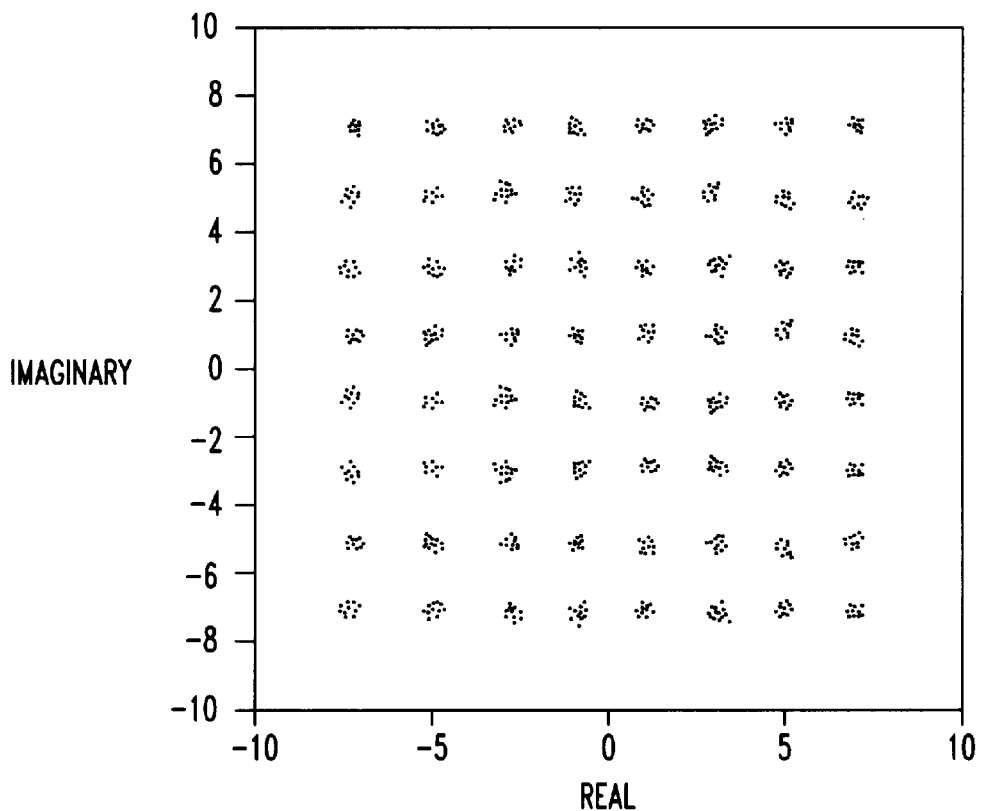
FIG. 18 shows a table providing a general comparison between the RCA, CMA, and MMA, blind equalization methods, without CHCF.

An X/Y display of the outputs $y_n$ and $\tilde{y}_n$ or, equivalently, of the complex output $Y_n=y_n+j\tilde{y}_n$, is called a signal constellation. FIGS. 6 and 17 show an 64-CAP constellation before and after illustrative convergence using the MMA algorithm. (The term "64-CAP," refers to the number of predefined symbols in the signal space or signal constellation each symbol representing 6 bits since $2^6$=64. Additional information on a CAP communications system can be found in J. J. Werner, "Tutorial on Carrierless AM/PM—Part I—Fundamentals and Digital CAP Transmitter," *Contribution to ANSI X3T9.5 TP/PMD Working Group*, Minneapolis, Jun. 23, 1992.) After convergence, the signal constellation consists of a display of the complex symbols $A_n=a_n+jb_n$ corrupted by some small noise and ISI.

In the normal mode of operation, decision devices (or slicers) 130 and 135 shown in FIG. 2 compare the sampled outputs $y_n$ and $\tilde{y}_n$ of equalizer 100 with valid symbol values $a_n$ and $b_n$ and makes a decision on which symbols have been transmitted. These sliced symbols will be denoted $\hat{a}_n$ and $\hat{b}_n$. The receiver then computes the following in-phase and quadrature errors $e_n$ and $\tilde{e}_n$:

$$e_n=y_n-\hat{a}_n, \tag{7a}$$

$$\tilde{e}_n=\tilde{y}_n-\hat{b}_n, \tag{7b}$$

and the tap coefficients of the two adaptive filters are updated using the familiar least-mean-square (LMS) algorithm, i.e., $$c_{n+1}=c_n-\alpha e_n r_n, \tag{8a}$$

$$d_{n+1}=d_n-\alpha \tilde{e}_n r_n, \tag{8b}$$

where $\alpha$ is the step size used in the tap adjustment algorithm.

Figure 4:
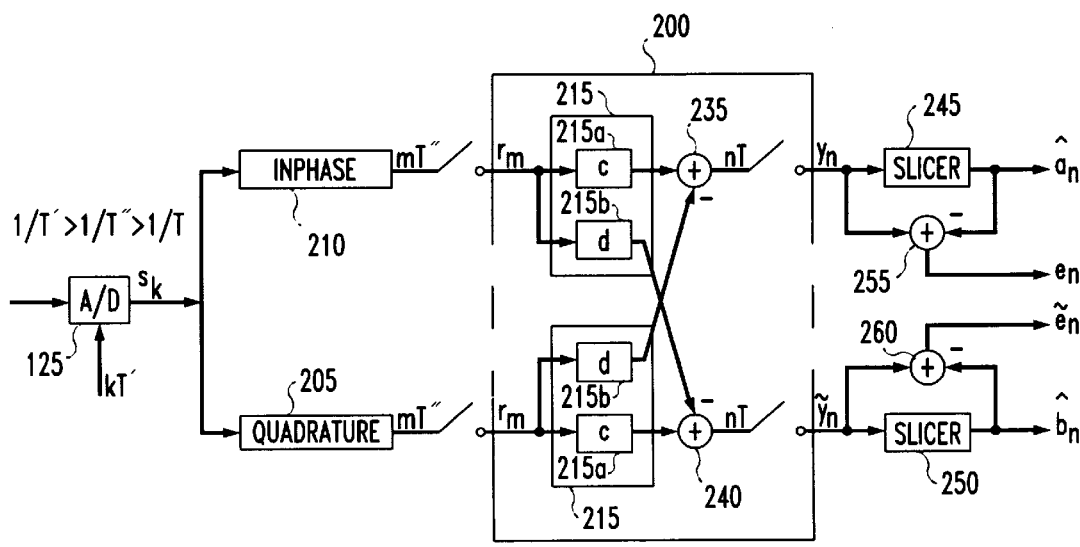
FIG. 4 is an illustrative block diagram of a cross-coupled equalizer.

Turning now to FIG. 4, a cross-coupled FSLE, 200, is shown. For this equalizer structure, the A/D samples are first fed to two fixed in-phase and quadrature FIR filters, 210 and 205, respectively. In this case, the sampling rate 1/T' of A/D 125 is typically equal to four times the symbol rate 1/T. The outputs of the two fixed FIR filters are computed at a rate 1/T" that is consistent with the sampling theorem for analytic signals as known in the art. The output signals are then fed to equalizer 200 having a so-called cross-coupled structure. Typically, 1/T" is twice the symbol rate 1/T.

The cross-coupled equalizer 200 uses two adaptive FIR filters 215a and 215b, each with tap vectors $c_n$ and $d_n$. For simplicity, the same tap vector notations $c_n$ and $d_n$ (which have been used for the previous described equalizer 100 of FIG. 2) are used again. However, it should be clear to those skilled in the art that the tap vectors are different for the two types of equalizers. These two filters are each used twice to compute the outputs $y_n$ and $\tilde{y}_n$ of the equalizer. Let $r_n$ and $\tilde{r}_n$ be the output vectors of the in-phase and quadrature filters that are used to compute the outputs of the cross-coupled equalizer. The following definitions can be made:

$$C_n=c_n+jd_n, \tag{9a}$$

$$R_n=r_n+j\tilde{r}_n, \text{ and} \tag{9b}$$

$$Y_n=y_n+j\tilde{y}_n. \tag{9c}$$

The complex output $Y_n$ of the equalizer can be written in the following compact way:

$$Y_n=C_n^{*T}R_n, \tag{10}$$

where the asterisk * denotes complex conjugate. Making the following definitions for the sliced complex symbol $\hat{A}_n$ and the complex error $E_n$:

$$\hat{A}_n = \hat{a}_n + j\hat{b}_n, \quad (11a)$$

$$E_n = Y_n - \hat{A}_n. \quad (11b)$$

The LMS algorithm for updating the complex tap vector $C_n$ can be written as:

$$C_{n+1} = C_n - \alpha E_n^* R_n. \quad (12)$$

Figure 5:
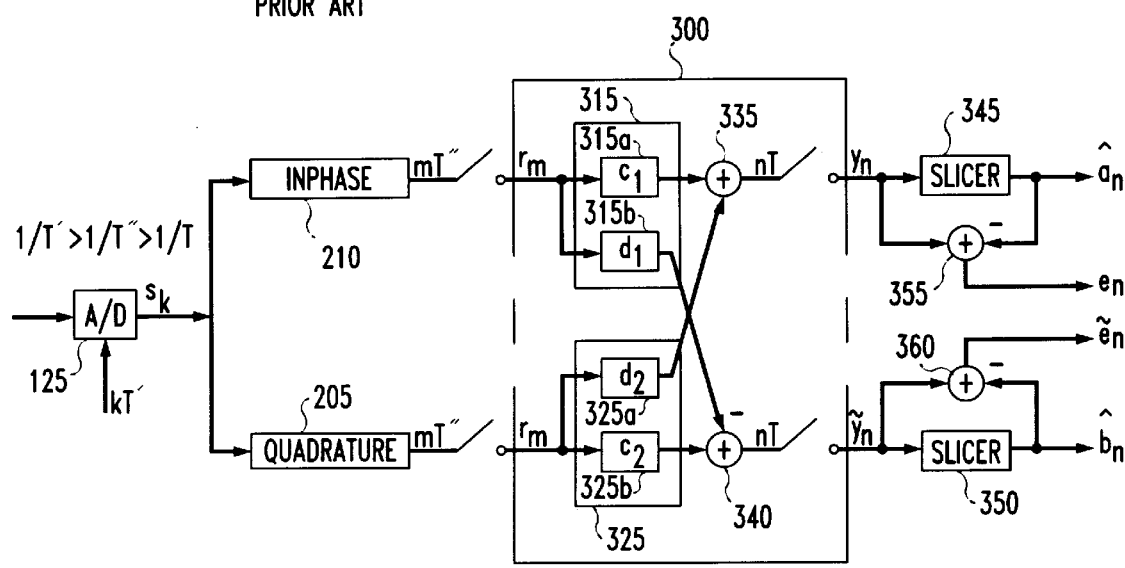
FIG. 5 is an illustrative block diagram of a four-filter equalizer.

Turning now to FIG. 5, a four-filter FSLE is shown. Four-filter equalizer 300 has the same general structure as cross-coupled FSLE 200 shown in FIG. 4, except that the adaptive portion consists of four different filters rather than two filters which are used twice. For this reason it is called a four-filter FSLE. The two output signals of equalizer 300 are computed as follows:

$$y_n = c_{1,n}^T r_n + d_{2,n}^T \tilde{r}_n, \text{ and} \quad (13a)$$

$$\tilde{y}_n = c_{2,n}^T \tilde{r}_n - d_{1,n}^T r_n. \quad (13b)$$

Using the definitions for the in-phase and quadrature errors $e_n$ and $\tilde{e}_n$ in equations (7a) and (7b), the following tap updating algorithms for the four filters result:

$$c_{1,n+1} = c_{1,n} - \alpha e_n r_n, \quad (14a)$$

$$d_{1,n+1} = d_{1,n} + \alpha \tilde{e}_n r_n, \quad (14b)$$

$$c_{2,n+1} = c_{2,n} - \alpha \tilde{e}_n \tilde{r}_n, \text{ and} \quad (15a)$$

$$d_{2,n+1} = d_{2,n} - \alpha e_n \tilde{r}_n. \quad (15b)$$

Having generally described the structure of some prior-art equalizers as shown in FIGS. 2–5, a general overview of the concept of blind equalization will now be described using the equalizer structure of FIG. 2.

Concept of Blind Equalization

In the normal (steady-state) mode of operation, the decision devices in FIG. 2, i.e., slicers 130 and 135, compare the equalizer complex output samples, $Y_n$, (where $Y_n = y_n + j\tilde{y}_n$), with all the possible transmitted complex symbols, $A_n$ (where $A_n = a_n + jb_n$), and selects the symbol $\hat{A}_n$ which is the closest to $Y_n$. The receiver then computes an error, $E_n$, where:

$$E_n = Y_n - \hat{A}_n, \quad (16)$$

which is used to update the tap coefficients of equalizer 100. This type of tap adaptation is called "decision directed", because it uses the decisions of slicers 130 and 135. The most common tap updating algorithm is the LMS algorithm, which is a stochastic gradient algorithm that minimizes the mean square error (MSE), which is defined as:

$$MSE \triangleq E[|E_n|^2] = E[|Y_n - \hat{A}_n|^2] = E[e_n^2] + E[\tilde{e}_n^2], \quad (17)$$

where $E[\cdot]$ denotes expectation and $e_n$ and $\tilde{e}_n$ are in-phase and quadrature errors, respectively.

At the beginning of start-up, the output signal of equalizer 100, $Y_n$, is corrupted by a lot of intersymbol interference, as illustrated in FIG. 6. The latter represents experimental data obtained for a 64-CAP receiver using a phase-splitting FSLE as represented by FIG. 2.

When a training sequence is used during start-up (i.e., a predefined sequence of $A_n$ symbols), the receiver can compute meaningful errors $E_n$ by using the equalizer output signal $Y_n$ and the known sequence of transmitted symbols $A_n$. In this case, tap adaptation is said to be done with "ideal reference" to distinguish it from decision directed tap adaptation.

However, when no training sequence is available, equalizer 100 has to be converged blindly. In this case, a decision-directed tap updating algorithm cannot be used to converge the equalizer, because the slicer makes too many wrong decisions, as should be apparent from FIG. 6.

As such, the philosophy of blind equalization is to use a tap adaptation algorithm that minimizes a cost function that is better suited to provide initial convergence of equalizer 100 than the MSE represented by equation (17). The cost fuictions used in the RCA, CMA, and MMA algorithms are described below.

Convergence of an equalizer during blind start-up usually consists of two main steps. First, a blind equalization algorithm is used to open the "eye diagram." (Hereafter, this will be referred to as "it opens the eye.") Once the eye is open enough, the receiver switches to a decision directed tap adaptation algorithm.

Reduced Constellation Algorithm (RCA)

This section provides a general overview of the RCA algorithm. This general overview is then followed with a description of the RCA algorithm in the context of each of the illustrative equalizer structures, described above.

Figure 8:
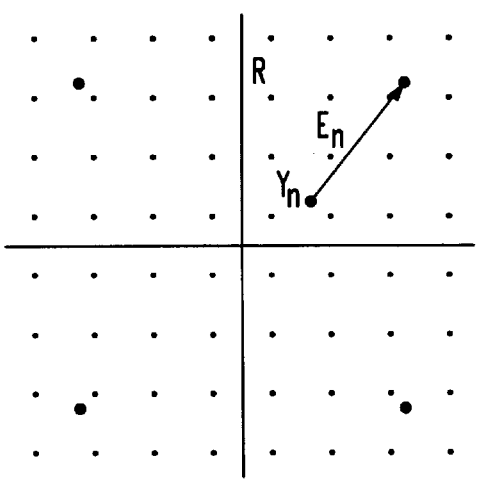
FIG. 8 is an illustrative signal point plot illustrating the reduced signal point constellation of the RCA blind equalization method.

With the RCA algorithm, the error used in the tap updating algorithm is derived with respect to a signal constellation that has a smaller number of points than the received constellation. As illustration, it is again assumed that the signal constellation comprises 64 symbols. In the RCA algorithm, the reduced constellation typically consists of four signal points only, as shown in FIG. 8. It should be noted that the RCA algorithm requires the use of a decision device, e.g., a slicer, to select the closest signal point from the reduced constellation. The error between the received sample $Y_n$ and the closest signal point $\hat{A}_{r,n}$ of the reduced constellation is the complex number:

$$E_{r,n} = e_{r,n} + j\tilde{e}_{r,n} = Y_n - \hat{A}_{r,n}, \text{ where} \quad (18)$$

$$\hat{A}_{r,n} = \hat{a}_{r,n} + j\hat{b}_{r,n} = R[\text{sgn}(y_n) + j\text{sgn}(\tilde{y}_n)], \text{ and} \quad (19)$$

where sgn $(\cdot)$ is the signum function and the expression on the right corresponds to the case where the reduced constellation consists of four points. The reduced constellation algorithm minimizes the following cost function:

$$CF = E[|E_{r,n}|^2] = E[e_{r,n}^2 + \tilde{e}_{r,n}^2] = E[|Y_n - \hat{A}_{r,n}|^2], \quad (20)$$

where $E[\cdot]$ denotes expectation and where $e_{r,n}$ refers to the slicer error.

Now, consider the phase-splitting equalizer structure shown in FIG. 2. Using equations (5), (6), and (20), the following equations result:

$$e_{r,n} = y_n - \hat{a}_{r,n} = c_n^T r_n - R\text{sgn}(y_n), \quad (21a)$$

$$\tilde{e}_{r,n} = \tilde{y}_n - \hat{b}_{r,n} = d_n^T r_n - R\text{sgn}(\tilde{y}_n) \quad (21b)$$

The gradients of the cost friction represented by equation (20) with respect to the tap vectors $c_n$ and $d_n$ are equal to:

$$\nabla_c(CF) = 2E[e_{r,n} r_n], \text{ and} \quad (22a)$$

$$\nabla_d(CF) = 2E[\tilde{e}_{r,n} r_n]. \quad (22b)$$

These gradients are equal to zero when the channel is perfectly equalized, i.e. when the received samples $Y_n$ are equal to the symbol values $A_n$. This condition leads to the following value of R:

$$R = \frac{E[a_n^2]}{E[|a_n|]}. \tag{23}$$

For example, consider the gradient with respect to the tap vector $c_n$. From the left of equations (21a) and (21b) there is the condition: $E[(y_n - R\,\mathrm{sgn}(y_n))r_n] = 0$. With perfect equalization $y_n = a_n$. Also, if it is assumed that different symbols are uncorrelated, then: $E[a_n r_n] = k_n E[a_n^2]$, where $k_n$ is a fixed vector whose entries are a function of the channel. The above condition can then be written as: $E[a_n^2] - R\, E[\mathrm{sgn}(a_n) a_n] = 0$. Noting that $\mathrm{sgn}(a_n) a_n = |a_n|$ and solving for R, equation (23) results.

The nonaveraged gradients in equations (22a) and (22b) can be used in a stochastic gradient algorithm to adapt the tap coefficients of the equalizer, so that the following tap updating algorithms result:

$$c_{n+1} = c_n - \alpha[y_n - R\,\mathrm{sgn}(y_n)] r_n, \text{ and} \tag{24a}$$

$$d_{n+1} = d_n - \alpha[\tilde{y}_n - R\,\mathrm{sgn}(\tilde{y}_n)] r_n. \tag{24b}$$

Turning now to the cross-coupled FSLE structure illustrated by FIG. 4, the complex output $Y_n$ of this equalizer is computed from equation (10). Using this expression in equation (20), the gradient of the cost function with respect to the complex tap vector $C_n$ is:

$$\nabla_C = E[(Y_n - \hat{A}_{r,n})^* R_n]. \tag{25}$$

Assuming a perfectly equalized channel the following expression for R results:

$$R = \frac{E[|A_n|^2]}{E[|a_n|] + E[|b_n|]} = \frac{E[|A_n|^2]}{2E[|a_n|]}, \tag{26}$$

where the expression on the right is the same as the one in equation (23) for the usual case where $E[|a_n|] = E[|b_n|]$. The tap updating algorithm for the complex tap vector $C_n$ is given by $$C_{n+1} = C_n - \alpha(Y_n - \hat{A}_{r,n})^* R_n. \tag{27}$$

Turning now to the four-filter FSLE structure illustrated by FIG. 5, the outputs $y_n$ and $\tilde{y}_n$ of this four-filter equalizer structure are computed from equations (13a) and (13b). The gradients of the cost function in equation (20) with respect to the four tap vectors are similar to the ones given in equations (22a) and (22b) and will not be repeated here. The tap updating algorithms are given by:

$$c_{1,n+1} = c_{1,n} - \alpha[y_n - R\,\mathrm{sgn}(y_n)] r_n, \tag{28a}$$

$$d_{1,n+1} = d_{1,n} + \alpha[\tilde{y}_n - R\,\mathrm{sgn}(\tilde{y}_n)] r_n \tag{28b}$$

$$c_{2,n+1} = c_{2,n} - \alpha[\tilde{y}_n - R\,\mathrm{sgn}(\tilde{y}_n)] \tilde{r}_n, \text{ and} \tag{28c}$$

$$d_{2,n+1} = d_{2,n} - \alpha[y_n - R\,\mathrm{sgn}(y_n)] \tilde{r}_n, \tag{28d}$$

where the constant R is the same as in equation (23).

The main advantage of RCA is its low cost of implementation because it is typically the least complex of blind equalization algorithms. The tap updating algorithms represented by equations (24a), (24b), (27) and (28) are the same as the standard LMS algorithms represented by equations (8a) and (8b) except that the slicer uses a different number of points.

The main disadvantages of RCA are its unpredictability and lack of robustness. The algorithm is known to often converge to so-called "wrong solutions." These solutions are quite acceptable from a channel equalization perspective, but do not allow the receiver to recover the right data. It should be pointed out that the equalizer structure in FIG. 2 is much more likely to converge to wrong solutions than the structure in FIG. 4. This is due to the fact that the former has many more degrees of freedom than the latter.

Figure 16:
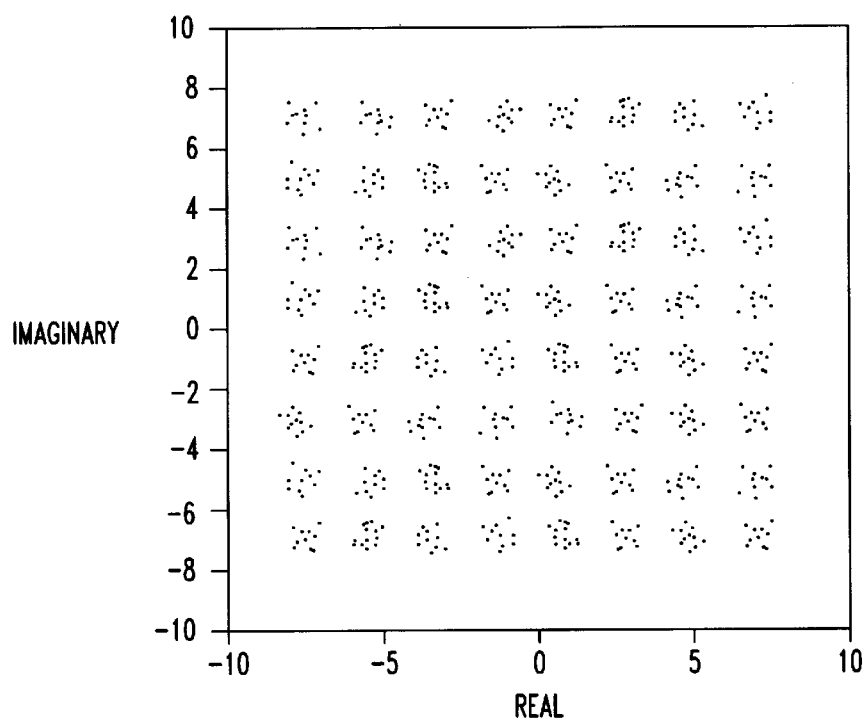
FIGS. 16 and 17 are illustrative signal point plots of an output signal of an equalizer for a communications system using a two-step MMA blind equalization method.
Figure 20:
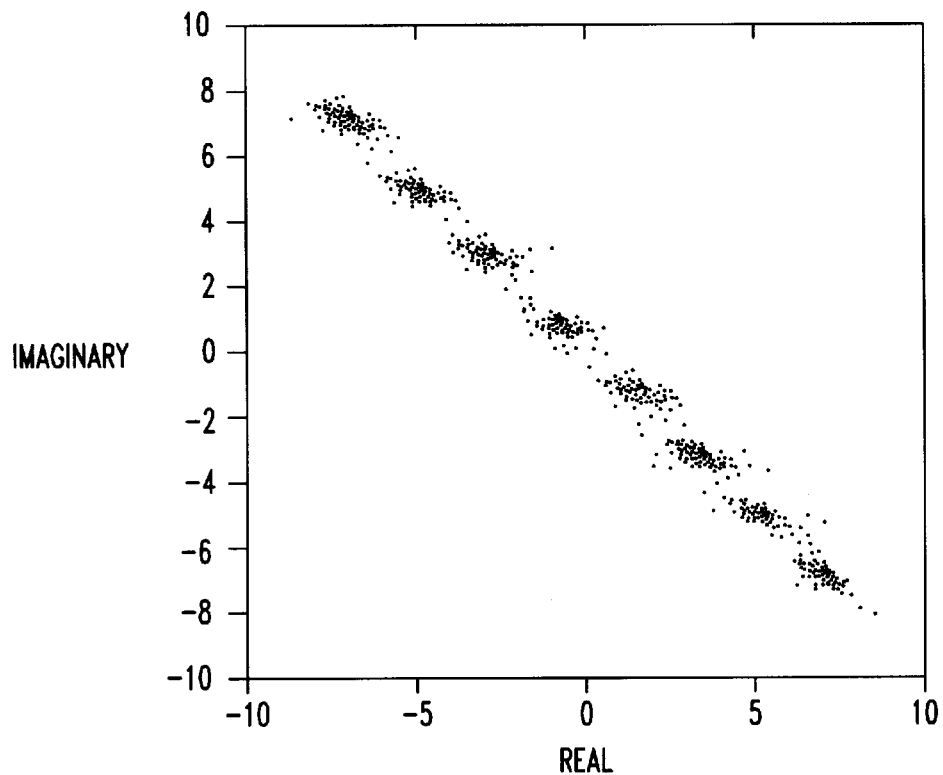
FIG. 20 is an illustrative graph of an incorrect diagonal solution for a 64-CAP signal point constellation.

A wrong solution that is often observed with the equalizer structure in FIG. 2 is the so-called diagonal solution. In this case, the in-phase and quadrature filters both converge to the same filter, so that they both generate the same output samples. As a result, the signal constellation at the output of the equalizer consists of points clustered along a diagonal as illustrated in FIG. 20 for a 64-CAP signal point constellation. It has been found that frequency of occurrence of diagonal solutions is mostly communications channel dependent. Specifically, it is created when certain fractional propagation delay offsets are introduced in the channel. (As a point of contrast, FIG. 16 shows an illustrative correct solution for a 64-CAP signal point constellation using the MMA blind equalization algorithm.)

Other wrong solutions can occur when the in-phase and quadrature filters introduce propagation delays which differ by an integral number of symbol periods. As an example, at a given sampling instant, $a_n$ may appear at the output of the in-phase filter while $b_{n-1}$ appears at the output of the quadrature filter. This kind of wrong solution can generate points in the signal constellation at the output of the equalizer that do not correspond to transmitted symbols. For example, a 32-point signal constellation may be converted into a 36-point constellation and the 128-point constellation in FIGS. 13, 14, and 15 may be converted into a 144-point constellation.

Constant Modulus Algorithm (CMA)

This section provides a general overview of the CMA algorithm. This general overview is then followed with a description of the CMA algorithm in the context of each of the illustrative equalizer structures, described above.

Figure 9:
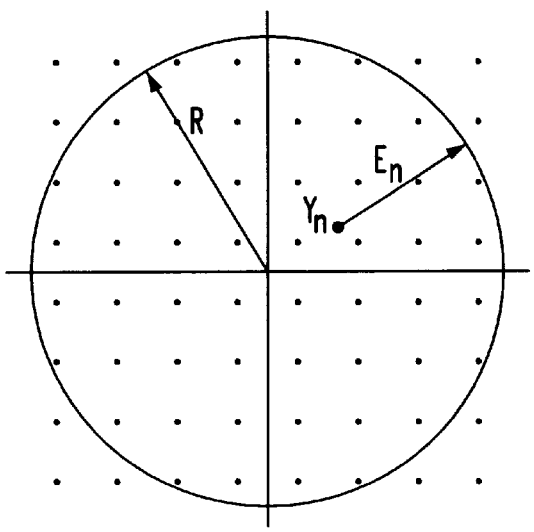
FIG. 9 is an illustrative signal point plot illustrating the circular contour of the CMA blind equalization method.

The CMA algorithm minimizes the dispersion of the equalized samples $Y_n$ with respect to a circle with radius R. This is graphically illustrated in FIG. 9. The CMA algorithm minimizes the following cost function:

$$CF = E\big[(|Y_n|^L - R^L)^2\big], \tag{29}$$

where L is a positive integer. The case L=2 is the most commonly used in practice. The cost function in equation (29) is a true two-dimensional cost function which minimizes the dispersion of the equalizer complex output signal $Y_n$ with respect to a circular two-dimensional contour.

Now, consider the phase-splitting equalizer structure shown in FIG. 2. The gradients of the cost function with respect to the tap vectors $c_n$ and $d_n$ are given by:

$$\nabla_c(CF) = 2L \times E[(|Y_n|^L - R^L)|Y_n|^{L-2} y_n r_n], \text{ and} \tag{30a}$$

$$\nabla_d(CF) = 2L \times E[(|Y_n|^L - R^L)|Y_n|^{L-2} \tilde{y}_n r_n]. \tag{30b}$$

Assuming a perfectly equalized channel the following value for $R^L$ results:

$$R^L = \frac{E[|A_n|^{2L-2} a_n^2]}{E[|A_n|^{L-2} a_n^2]} = \frac{E[|A_n|^{2L}]}{E[|A_n|^L]}, \tag{31}$$

where the expression on the right holds for the usual case where the statistics of the symbols $a_n$ and $b_n$ are the same.

For L=2, the following stochastic gradient tap updating algorithms results:

$$c_{n+1}=c_n-\alpha(y_n^2+\tilde{y}_n^2-R^2)y_n r_n, \text{ and} \qquad (32a)$$

$$d_{n+1}=d_n-\alpha(y_n^2+\tilde{y}_n^2-R^2)\tilde{y}_n r_n. \qquad (32b)$$

Turning now to the cross-coupled FSLE structure illustrated by FIG. 4, the gradient of the cost function represented by equation (29) with respect to the complex tap vector $C_n$ is equal to:

$$\nabla_c(CF)=2L\times E[(|Y_n|^L-R^L)|Y_n|^{L-2}Y_n^*R_n]. \qquad (33)$$

For L=2, the tap updating algorithm for the complex tap vector becomes:

$$C_{n+1}=C_n-\alpha(|Y_n|^2-R^2)Y_n^*R_n, \qquad (34)$$

where R is given by the expression on the right in equation (31).

Turning now to the four-filter FSLE structure illustrated by FIG. 5, the gradients of the cost function represented by equation (29) with respect to the four tap vectors are similar to the ones given by equations (30a) and (30b). For L=2, the tap updating algorithms become:

$$c_{1,n+1}=c_{1,n}-\alpha(y_n^2+\tilde{y}_n^2-R^2)y_n r_n, \qquad (35a)$$

$$d_{1,n+1}=d_{1,n}+\alpha(y_n^2+\tilde{y}_n^2-R^2)\tilde{y}_n r_n, \qquad (35b)$$

$$c_{2,n+1}=c_{2,n}-\alpha(y_n^2+\tilde{y}_n^2-R^2)\tilde{y}_n \tilde{r}_n, \text{ and} \qquad (35c)$$

$$d_{2,n+1}=d_{2,n}-\alpha(y_n^2+\tilde{y}_n^2-R^2)y_n \tilde{r}_n. \qquad (35d)$$

The constant R is the same as in equation (31).

The main advantages of CMA are its robustness and predictability. Unlike RCA, it rarely converges to wrong solutions. For some applications, other than those considered here, it also has the advantage of being able to partially equalize the channel in the presence of carrier phase variations. The main disadvantage of CMA is its cost of implementation. The CMA tap updating algorithm is more complex than that of the RCA algorithm and the MMA algorithm and, in addition, the CMA algorithm requires a so-called "rotator" at the output of the equalizer. As a result, once a certain degree of convergence is achieved, the output signal of the equalizer must be counter-rotated before switching to a decision-directed tap adaptation algorithm. The need to use a rotator after the equalizer increases the cost of implementation of CMA for some type of applications. It should be pointed out, however, that there are other applications, such as voiceband and cable modems, where the rotator function is required anyway for other purposes, such as tracking frequency offset introduced in the channel. In these latter cases, the need to do a rotation does not increase the cost of implementation, and CMA becomes a very attractive approach.

Multimodulus Algorithm (MMA)

Figure 10:
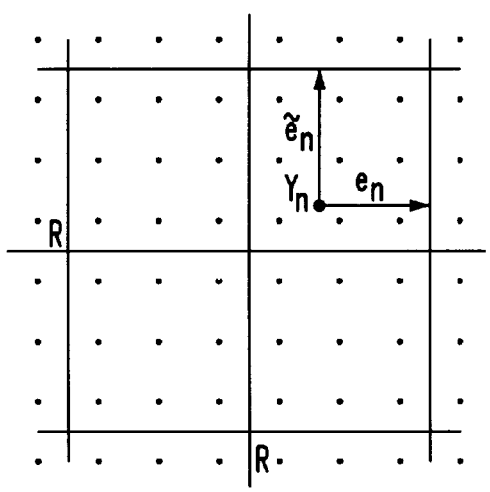
FIG. 10 is an illustrative signal point plot illustrating the piecewise linear contours of the MMA blind equalization method.

The MMA algorithm minimizes the dispersion of the equalizer output samples $y_n$ and $\tilde{y}_n$ around piecewise linear in-phase and quadrature contours. For the special case of square signal constellations of the type used for 16-, 64-, and 256-CAP systems, the contours become straight lines. This is graphically illustrated in FIG. 10 for a 64-point constellation. The multimodulus algorithm minimizes the following cost function:

$$CF=E[(y_n^L-R^L(Y_n))^2+(\tilde{y}_n^L-R^L(Y_n))^2], \qquad (36)$$

where L is a positive integer and $R(Y_n)$ and $\tilde{R}(Y_n)$ take discrete positive values, which depend on the equalizer outputs $Y_n$.

Multimodulus Algorithm (MMA—Square Constellations

For square constellations, $R(Y_n)=\tilde{R}(Y_n)=R=$constant, so that the cost function of equation (36) becomes:

$$CF=CF_I+CF_Q=E[(y_n^L-R^L)^2+(\tilde{y}_n^L-R^L)^2]. \qquad (37)$$

Unlike the cost function for CMA represented by equation (29), this is not a true two-dimensional cost function. Rather, it is the sum of two independent one-dimensional cost functions $CF_I$ and $CF_Q$. The application of the MMA algorithm in the context of the three illustrative types of equalizers (described above) will now be described.

For the phase-splitting equalizer structure shown FIG. 2, the gradients of the cost function in equation (37) with respect to the tap vectors $c_n$ and $d_n$ are equal to:

$$\nabla_c(CF)=2L\times E[(|y_n|^L-R^L)|y_n|^{L-2}y_n r_n], \text{ and} \qquad (38a)$$

$$\nabla_d(CF)=2L\times E[(|\tilde{y}_n|^L-R^L)|\tilde{y}_n|^{L-2}\tilde{y}_n r_n]. \qquad (38b)$$

Assuming a perfectly equalized channel, the following value for $R^L$ results:

$$R^L=\frac{E[a_n^{2L}]}{E[|a_n|^L]} \qquad (39)$$

The best compromise between cost and performance is achieved with L=2, in which case the tap updating algorithms become $$c_{n+1}=c_n-\alpha(y_n^2-R^2)y_n r_n, \text{ and} \qquad (40a)$$

$$d_{n+1}=d_n-\alpha(\tilde{y}_n^2-R^2)\tilde{y}_n r_n. \qquad (40b)$$

Turning now to the cross-coupled FSLE structure illustrated by FIG. 4, the gradient of the cost function represented by equation (37) with respect to the complex tap vector $C_n$ is given by:

$$\nabla_c(CF)=2L\times E[K^*R_n], \qquad (41)$$

where, $$K=[(|y_n|^L-R^L)|y_n|^{L-2}y_n]+j[(|\tilde{y}_n|^L-R^L)|\tilde{y}_n|^{L-2}\tilde{y}_n]. \qquad (42)$$

Assuming a perfectly equalized channel, the value for $R^L$ is:

$$R^L=\frac{E[a_n^{2L}+b_n^{2L}]}{E[|a_n|^L+E|b_n|^L]}, \qquad (43)$$

which reduces to equation (39) for the usual case where the symbols $a_n$ and $b_n$ have the same statistics. For L=2, the tap updating algorithm for the complex tap vector $C_n$ becomes:

$$C_{n+1}=C_n-\alpha K^*R_n, \qquad (44)$$

where, $$K=(y^2-R^2)y+j(\tilde{y}^2-R^2)\tilde{y}. \qquad (45)$$

Turning now to the four-filter FSLE structure illustrated by FIG. 5, the gradients of the cost function represented by equation (37) with respect to the four tap vectors are similar to the ones given in equations (38a and 38b). For L=2, the tap updating algorithms become:

$$c_{1,n+1} = c_{1,n} - \alpha(y_n^2 - R^2) y_n r_n, \quad (46a)$$

$$d_{1,n+1} = d_{1,n} + \alpha(\tilde{y}_n^2 - R^2) \tilde{y}_n r_n, \quad (46b)$$

$$c_{2,n+1} = c_{2,n} - \alpha(\tilde{y}_n^2 - R^2) \tilde{y}_n \tilde{r}_n, \text{ and} \quad (46c)$$

$$d_{2,n+1} = d_{2,n} - \alpha(y_n^2 - R^2) y_n \tilde{r}_n. \quad (46d)$$

The constant R is the same as in equation (39).

Figure 7:
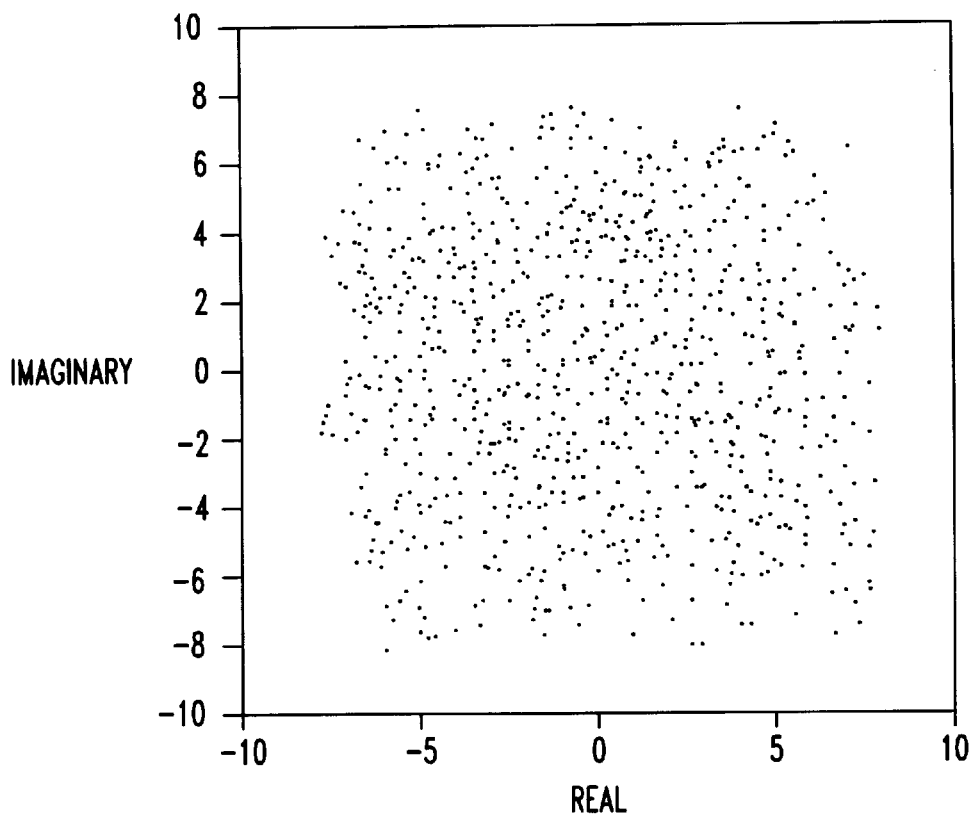
FIG. 7 is an illustrative signal point plot of an output signal of an equalizer for a system using the MMA blind equalization method.

The above-mentioned two-step blind equalization procedure utilizing the MMA algorithm is graphically illustrated by FIGS. 6, 7, 16, and 17 for equalizer 100. The output signal of equalizer 100, before any form of convergence, is shown in FIG. 6. As noted above, FIG. 6 represents experimental data obtained for a 64-CAP receiver using a phase-splitting FSLE as represented by FIG. 2. FIG. 7 illustrates the beginning of the MMA process convergence. As shown in FIG. 16, the MMA technique converges the equalizer enough to clearly illustrate the 64-symbol signal space as 64 noisy clusters. Although these noisy clusters would, typically, not be acceptable for steady-state operation—the eye is open enough to allow the receiver to switch to a 64-point slicer and a decision-directed LMS algorithm. The end result is a much cleaner constellation, as shown in FIG. 17. Typically, a clean transition can be made between the two modes of adaptation, MMA and decision directed, when the symbol error rate is better than $10^{-2}$, although successful transitions have been observed for worse symbol error rates. It should be pointed out that the noisy clusters in FIG. 16 could be further reduced by decreasing the step size in the MMA tap adjustment algorithm. Indeed, in some applications it may be possible to eliminate the switching to a decision directed tap adaptation algorithm. However, it should be noted that this would increase the start-up time and the required amount of digital precision.

The MMA algorithm for square constellations can be used without modification for nonsquare constellations. In this case, caution has to be exercised in the computation of the constant R, because the discrete levels for the symbols $a_n$ and $b_n$ do not all have the same probability of occurrence (described below). However, it has been found through computer simulations that convergence of the MMA algorithm is somewhat less reliable for nonsquare constellations than for square constellations. This can be corrected by using the modified MMA discussed in the following section.

Multimodulus Algorithm (MMA)—NonSquare Constellations

Figure 13:
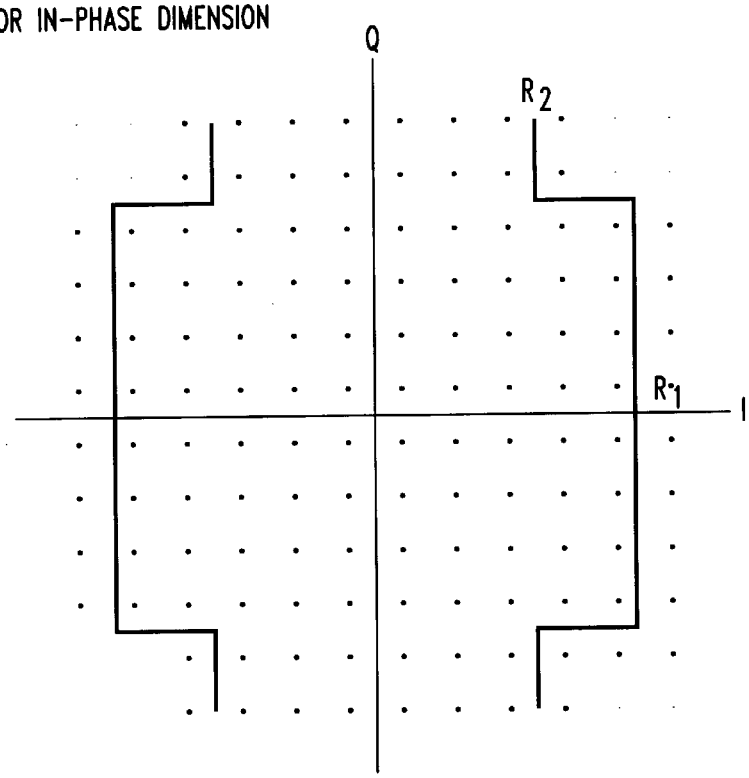
FIGS. 13, 14, and 15, are illustrative signal point plots illustrating the piecewise linear contours of the MMA blind equalization method for a nonsquare constellation.
Figure 14:
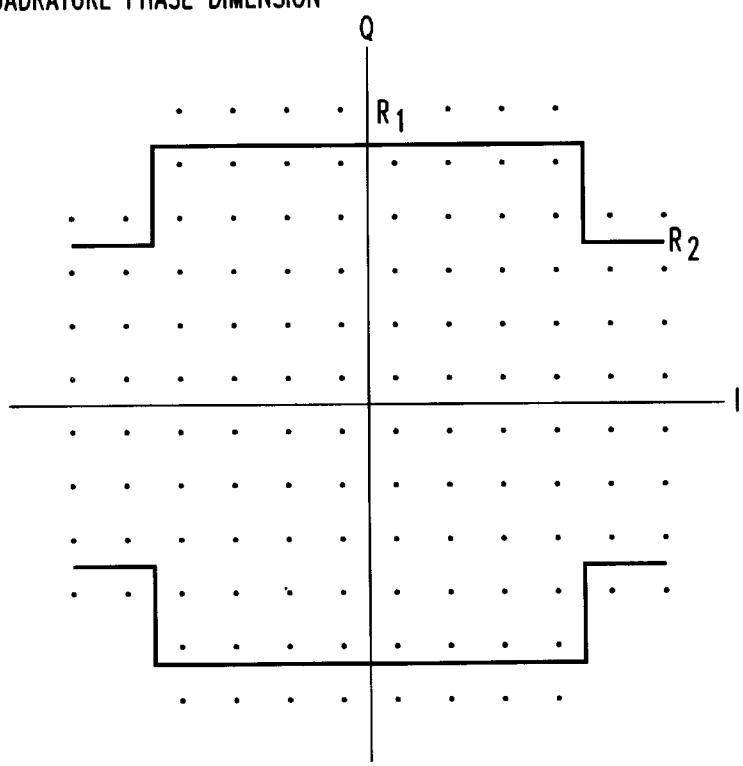
Figure 15:
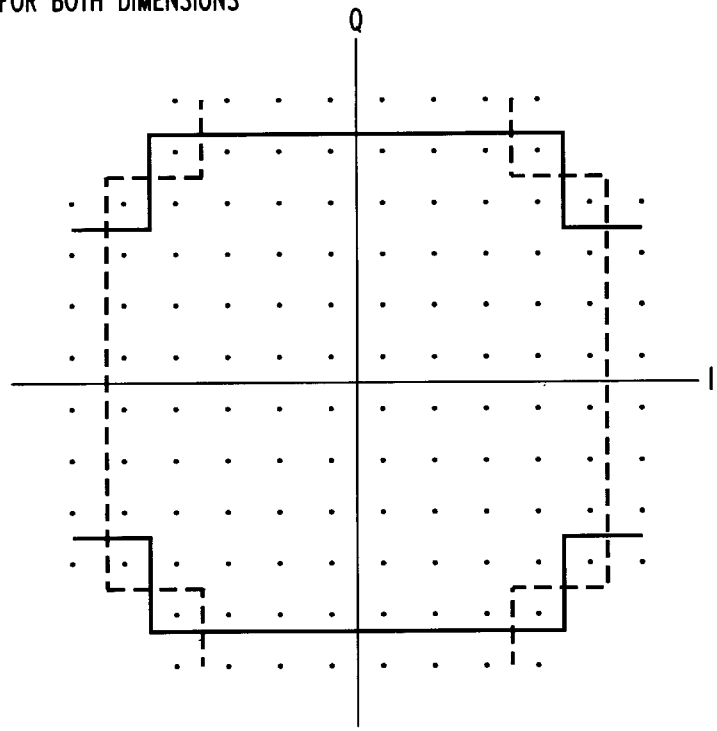

The principle of the modified MMA is illustrated in FIGS. 13, 14, and 15, with respect to a 128-CAP signal constellation. (A 128-point signal constellation is obtained in the following way. First define a 144-point signal constellation using the symbol levels ±1,±3,±5,±7,±9,±11, and then remove the four corner points in each quadrant.) Minimization of the dispersion of the equalizer output samples $y_n$ and $\tilde{y}_n$ is now done around piecewise straight lines. Again, this is done independently for $y_n$ and $\tilde{y}_n$. The quadrature cost functions derived from equation (37) are:

$$CF_Q = E[(\tilde{y}_n^L - R_1^L)^2] \text{ if } |y_n| < K, \text{ and} \quad (47a)$$

$$CF_Q = E[(\tilde{y}_n^L - R_2^L)^2] \text{ if } |y_n| > K. \quad (47b)$$

The in-phase cost functions derived from equation (37) are:

$$CF_I = E[(y_n^L - R_1^L)^2] \text{ if } |\tilde{y}_n| < K, \text{ and} \quad (47c)$$

$$CF_I = E[(y_n^L - R_2^L)^2] \text{ if } |\tilde{y}_n| > K. \quad (47d)$$

The constant K is a function of the signal constellation under consideration and is determined empirically. In computer simulations for 128-CAP, a suggested value is K=8. Two different moduli $R_1$ and $R_2$ are used in equations (47) because the symbols $a_n$ and $b_n$ used in the 128-point constellation have two sets of levels {±1,±3,±5,±7} and {±9, ±11} which have a different probability of occurrence. More moduli can be used if there are more than two sets of symbol levels with different statistics.

The moduli $R_1$ and $R_2$ in equations (47) are computed from equation (39) by evaluating the moments of the symbols over the set of symbol levels to which a given modulus applies (additionally described below). As an example, consider FIG. 13, which illustrates the Moduli for the in-phase dimension and which applies to the real symbols $a_n$ of a 128-CAP signal constellation. The moments of the symbols can be computed by considering the first quadrant only. Consider the subset of 24 symbols in this quadrant that applies to $R_1$. For these symbols $a_n$=1, 3, 5, 7, 9, 11; and $b_n$=1, 3, 5, 7; so that each value of $a_n$ occurs with probability 4/24=1/6. Similarly, the $R_2$ subset has 8 symbols for which $a_n$=1, 3, 5, 7 and $b_n$=9, 11, so that each value of an occurs with probability 2/8=1/4. Thus, the variance of the symbols becomes:

for $R_1$ symbols, $E[a_n^2] = \frac{1}{6}(1^2+3^2+5^2+7^2+9^2+11^2) \approx 47.67$, and (48a)

for $R_2$ symbols, $E[a_n^2] = \frac{1}{4}(1^2+3^2+5^2+7^2) = 21$. (48b)

Other moments of the symbols are computed in a similar fashion and then used in equation (39) to evaluate the values of the various moduli.

The tap updating algorithms for the modified MMA algorithm are the same as the ones given in equations (40), (44), and (46), except that the constant R is replaced by either $R_1$ or $R_2$ depending on which equalizer output sample $Y_n$ is received. FIG. 14 illustrates the Moduli for the quadrature dimension and which applies to the symbols $b_n$ of the 128-CAP signal constellation. It should be apparent from FIG. 15, which represents the union of FIGS. 13 and 14, that the in-phase and quadrature tap updating algorithms need not use the same moduli $R_1$ or $R_2$ in a given symbol period.

Moments of Data Symbols

The following description discusses the concept of "moments of data symbols." In particular, the closed-form expressions for the moments $E[|a_n|^L]$, $E[|b_n|^L]$, and $E[|A_n|^L]$ when the symbols $a_n$ and $b_n$ take values proportional to the odd integers ±1,±3,±5,±7, . . . , are presented. These expressions are then used to get closed-form expressions for the constants R used in the three blind equalization algorithms and illustrated in the table of FIG. 19 (described below).

First, it is assumed that the symbols $a_n$ and $b_n$ have the same statistics, so that $E[|a_n|^L] = E[|b_n|^L]$. Consider first the following known summations of powers of integers:

$$\sum_{k=1}^{m} k = \frac{1}{2} m(m+1), \quad (49a)$$

$$\sum_{k=1}^{m} k^2 = \frac{1}{6} m(m+1)(2m+1), \quad (49b)$$

$$\sum_{k=1}^{m} k^3 = \frac{1}{4} [m(m+1)]^2, \text{ and} \quad (49c)$$

$$\sum_{k=1}^{m} k^4 = \frac{1}{30}m(m+1)(2m+1)(3m^2+3m-1). \quad (49d)$$

These summations can be used to find closed-form expressions for sums of powers of odd integers. For example, for power one:

$$(1+3+5+7) = \quad (50)$$

$$(1+2+3+4+5+6+7) - 2(1+2+3) \rightarrow \sum_{k=1}^{m}(2k-1) =$$

$$\sum_{k=1}^{2m-1} k - 2\sum_{k=1}^{m-1} k = m^2,$$

where the two summations in the middle have been evaluated by using the closed-form expression of equation (49a). Similar series manipulations can be used for other sums of powers of odd integers.

Now, consider square signal constellations which use symbols $a_n$ and $b_n$ with values $\pm 1, \pm 3, \pm 5, \pm 7, \ldots \pm(2m-1)$, where m is the number of different symbol levels (in magnitude). As an example, for the 4-CAP, 16-CAP, 64-CAP, and 256-CAP square signal constellations, m=1, 2, 4, and 8, respectively. It is also assumed that all the symbol values are equiprobable. As a result, the moments of the symbols $a_n$ are:

$$E[|a_n|] = \frac{1}{m} \cdot \sum_{k=1}^{m}(2k-1) = m, \quad (51)$$

$$E[a_n^2] = \frac{1}{m} \cdot \sum_{k=1}^{m}(2k-1)^2 = \frac{1}{3}(4m^2-1), \quad (52)$$

$$E[|a_n|^3] = \frac{1}{m} \cdot \sum_{k=1}^{m}(2k-1)^3 = m(2m^2-1), \text{ and} \quad (53)$$

$$E[a_n^4] = \frac{1}{m} \cdot \sum_{k=1}^{m}(2k-1)^4 = \frac{1}{15}(4m^2-1)(12m^2-7). \quad (54)$$

Next, consider the complex symbols $A_n = a_n + jb_n$. Assuming that the symbols $a_n$ and $b_n$ are uncorrelated, the following expressions for the even moments of the complex symbols result:

$$E[|A_n|^2] = 2E[a_n^2], \text{ and} \quad (55a)$$

$$E[|A_n|^4] = 2E[a_n^4] + 2[E|a_n^2|]^2. \quad (55b)$$

Using equations (52) and (54) in equation (55b), results in:

$$E[|A_n|^4] = \frac{4}{45}(4m^2-1)(28m^2-13). \quad (56)$$

The above results can now be used to get closed-form expressions for the constants R used in the various blind equalization algorithms. The following (remarkably simple) expressions for these constants result:

$$R_{rca} \frac{E[a_n^2]}{E[|a_n|]} = \frac{4m^2-1}{3m}, \quad (57)$$

$$R_{mma}^2 \frac{E[a_n^4]}{E[a_n^2]} = \frac{12m^2-7}{5}, \text{ and} \quad (58)$$

$$R_{mma}^2 \frac{E[|A_n|^4]}{E[|A_n|^2]} = \frac{56m^2-26}{15}. \quad (59)$$

With respect to nonsquare signal constellations, the various symbol levels 2k-1 for $a_n$ and $b_n$ have a different probability of occurrence, even when all the complex symbols $A_n$ are equiprobable. This should be apparent from the 128-point constellation illustrated by FIG. 15. In this case, the moments of the symbols have to be computed according to the general formula:

$$E[|a_n|^L] = P_1 \sum_{k=1}^{m_1}(2k-1)^L + P_2 \sum_{m_1+1}^{m_2}(2k-1)^L + P_3 \sum_{m_2+1}^{m_3}(2k-1)^L + \ldots \quad (60)$$

where $P_i$ is the probability of occurrence of the symbol levels appearing in the corresponding summation. For typical 32-CAP and 128-CAP constellations the expression in (60) is restricted to two different probabilities $P_1$ and $P_2$.

Everything else being equal (i.e. symbol rate, shaping filters, etc.), it is possible to guarantee a constant average power at the output of a CAP transmitter if $E[a_n^2]=E[b_n^2]=$ constant, independently of the type of signal constellation that is used. Of course, different signal constellations will have to use different symbol values if the average power constraint has to be satisfied. Thus, in general, a signal constellation will use symbol values $\lambda(2k-1)$ where $\lambda$ is chosen in such a way that the average power constraint is satisfied. For simplicity, it is assumed that $E[a_n^2]=1$. For square constellations, the value of $\lambda$ can then be determined from equation (52), to result in:

$$E[a_n^2] = \frac{1}{m}\sum_{k=1}^{m}[\lambda(2k-1)]^2 = \frac{\lambda^2(4m^2-1)}{3} = 1 \rightarrow \lambda^2 = \frac{3}{4m^2-1}. \quad (61)$$

Using this expression of $\lambda$ in equations (57), (58), and (59), the following expressions for the normalized constants R result:

$$\overline{R}_{rca} = \lambda \frac{E[a_n^2]}{E[|a_n|]} = \frac{\sqrt{4m^2-1}}{m\sqrt{3}}, \quad (62)$$

$$\overline{R}_{mma}^2 = \lambda^2 \frac{E[a_n^4]}{E[a_n^2]} = \frac{3}{5}\frac{12m^2-7}{4m^2-1}, \text{ and} \quad (63)$$

$$\overline{R}_{cma}^2 = \lambda^2 \frac{E[|A_n|^4]}{E[|A_n|^2]} = \frac{1}{5}\frac{56m^2-26}{4m^2-1}. \quad (64)$$

Similar expressions can be obtained for nonsquare constellations in a similar fashion. When the number of points in the signal constellation becomes very large, the following asymptotic values for the normalized constants result:

$$m \rightarrow \infty \quad \overline{R}_{rca} \approx 1.155 \quad \overline{R}_{mma} \approx 1.342 \quad \overline{R}_{cma} \approx 1.673. \quad (65)$$

Summary of RCA, CMA, and MMA Algorithms

A general comparison of the RCA, CMA, and MMA techniques is shown in the table of FIG. 18. In addition, the table shown in FIG. 19 shows illustrative values, for signal constellations of different sizes, of the constants R, $R_1$, and $R_2$, which are used in the tap updating algorithms of the RCA, CMA, and MMA, blind equalization techniques described above. The data shown in FIG. 19 assumes that the symbols $a_n$ and $b_n$ take the discrete values $\pm 1, \pm 3, \pm 5, \pm 7, \ldots$ The closed-form expressions for these constants are derived as described above.

Generally speaking, the RCA algorithm has less reliable convergence than either the CMA or MMA algorithms. As between the CMA and MMA algorithms, these algorithms have both benefits and drawbacks. For example, the CMA algorithm provides reliable convergence—thus avoiding incorrect diagonal solutions—but the CMA algorithm requires an expensive rotator. In comparison, the MMA algorithm does not require an expensive rotator but is more susceptible than the CMA algorithm to incorrect convergence.

Number of Symbol Levels

Any blind convergence technique is affected by the distribution of the output signals, or samples, of the equalizer. As such, an increase in the number of symbol levels increases the distribution of the equalizer output samples, which—in turn—makes it more difficult to blindly converge the equalizer. This is illustrated by the following comparison between the MMA blind equalization algorithm and the standard LMS algorithm.

For the standard LMS algorithm, the cost function minimizes the error between the equalizer's output signals $Y_n$ and an unknown sequence of transmitted symbols $A_n$:

$$CF = E[(Y_n - A_n)^2] = E[(y_n - a_n)^2 + (\tilde{y}_n - b_n)^2] = E[e_n^2(LMS) + \tilde{e}_{r,n}^2(LMS)] \quad (66)$$

where $Y_n = y_n + j\tilde{y}_n$, and $A_n = a_n + jb_n$.

In comparison, for the MMA blind equalization algorithm, the cost function minimizes the dispersion of the constellation:

$$CF = E[(y_n^2 - R^2)^2 + (\tilde{y}_n^2 - R^2)^2] = E[e_{r,n}^2(CF) + \tilde{e}_{r,n}^2(CF)], \quad (67)$$

where the expression of the constant R is given by:

$$R^2 = \frac{E[a_n^4]}{E[a_n^2]}. \quad (68)$$

Comparing the two cost functions in equations (66) and (67) it can be observed that errors have different interpretations for the LMS algorithm and the MMA algorithm.

In the LMS algorithm, the error $e_{r,n}(LMS)$ is defined as $$e_{r,n}(LMS) = y_n - a_n; \quad (69)$$

and taps are updated in the opposite direction of the gradient:

$$c_{n+1} = c_n - \mu e_{r,n}(LMS) r_n = c_n - \mu (y_n - a_n) r_n. \quad (70)$$

When $y_n$ and $a_n$ represent the input and output of a slicer, the LMS-based error used during tap updating is equivalent to the error measured at the slicer and is a well-defined quantity. As such, an equalizer can converge to optimal solutions when errors are directly calculated with respect to the inputs and outputs of the slicer.

In contrast, in the MMA algorithm the error $e_{r,n}(CF)$ is defined differently. It should be noted that since the LMS algorithm uses second-order statistics of the signals, whereas MMA uses fourth-order statistics, a simplified version of the MMA algorithm, with L=1, is used here for comparison purposes. For this one-dimensional MMA the error $e_{r,n}(CF)$ of the generalized MMA becomes $$e_{r,n}(CF) = |y_n| - R; \quad (71)$$

and the taps of the filter are updated as follows:

$$c_{n+1} = c_n - \mu e_{r,n}(CF) r_n = c_n - \mu (|y_n| - R) r_n. \quad (72)$$

From equation (72), the taps are not exactly updated in the direction of the slicer errors. Instead, error minimization is done with reference to the constant R that has statistical information about the real symbols $a_n$. The occurrence of filter adaptation depends on the occurrence of R, which depends on m. Consequently, the error $e_{r,n}(CF)$ has only a statistical meaning and an equalizer is not always guaranteed to converge to optimal solutions in terms of mean-square error (MSE).

If a blind equalization algorithm is not optimum, then $CF \neq 0$ when an equalizer has converged. That is, residual values of the cost function exist. Illustratively, the MMA algorithm is examined to explore what are the residual values of the cost function CF.

For a blind start-up with a perfect convergence, $y_n \rightarrow a_n$. Consequently, the cost function CF converges to $CF_{a,n}$:

$$CF = E[(y_n^2 - R^2)^2] \rightarrow CF_{a,n} = E[(a_n^2 - R^2)^2]. \quad (73)$$

This cost function $CF_{a,n}$ is expanded and simplified as follows:

$$CF_{an} = E[(a_n^2 - R^2)^2] \quad (74a)$$

$$= E[a_n^4 - 2a_n^2 R^2 + R^4] \quad (74b)$$

$$= E\left[a_n^4 - 2a_n^2 \frac{E[a_n^4]}{E[a_n^2]} + R^4\right] \quad (74c)$$

$$= E[a_n^4] - 2E[a_n^2] \frac{E[a_n^4]}{E[a_n^2]} + R^4 \quad (74d)$$

$$= R^4 - E[a_n^4] \quad (74e)$$

$$= \frac{E^2[a_n^4]}{E^2[a_n^2]} - E[a_n^4]. \quad (74f)$$

It should be noted that only analysis for the in-phase dimension is provided, and that the same analysis applies to the quadrature phase dimension. The cost function can be expressed as a function of the number of symbol levels m. From the above description of the calculations of "Moments of Data Symbols," the constant R is given by:

$$R^2 = \frac{12m^2 - 7}{5}, \quad (75)$$

and the fourth moment of the symbols $a_n$ is given by:

$$E[a_n^4] = \frac{1}{15}(4m^2 - 1)(12m^2 - 7). \quad (76)$$

Then the cost function $CF_{a,n}$ can be rewritten as:

$$CF_{an} = R^4 - E[a_n^4] \quad (77)$$

$$= \left(\frac{12m^2 - 7}{5}\right)^2 - \frac{1}{15}(4m^2 - 1)(12m^2 - 7) \quad (78)$$

$$= \frac{16}{75}(12m^2 - 7)(m^2 - 1) \quad (79)$$

$$= \frac{16}{75}(12m^4 - 19m^2 + 7). \qquad (80)$$

Equation (80) gives a simple way to express the cost function after convergence and steady-state values of the cost function $CF_{a,n}$ can be easily calculated. The number of symbol levels m (in magnitude) can be computed from the number of constellation points C for C-CAP:

$$m = \frac{\sqrt{C}}{2}. \qquad (81)$$

Equation (80) shows that $CF_{a,n}=0$ for m=1, and $CF_{a,n}\neq 0$ for m≠1. For instance, calculating $CF_{a,n}$ gives the following results: $CF_{a,n}=0$ for 4-CAP with m=1, $CF_{a,n}=14.2$ dB for 16-CAP with m=2, and $CF_{a,n}=27.7$ dB for 64-CAP with m=4, etc. This means that the optimum convergence for a blind equalizer can only be achieved for 4-CAP with m=1. Residual values of the cost function $CF_{a,n}$ significantly increase with increasing m. Ultimately, due to large values of the number m, residual values of $CF_{a,n}$ become so large that a blind equalizer fails to converge.

Residual values of $CF_{a,n}$ are increasing functions of the number m, and convergence of an equalizer is directly affected by those values. In conclusion, the reliability of a blind algorithm is highly degraded with increasing values of m. When the residual values of $CF_{a,n}$ increase beyond some quantity, the eye diagram fails to open. It has been experimentally found that a standard MMA is only effective for CAP applications with m less that eight which corresponds to 256-CAP.

A Windowing Approach to Blind Convergence

In accordance with the inventive concept, a blind convergence technique is restricted to using a subset of the equalizer output samples. This improves the ability to blindly converge the equalizer notwithstanding an increase in symbol levels.

Figure 21:
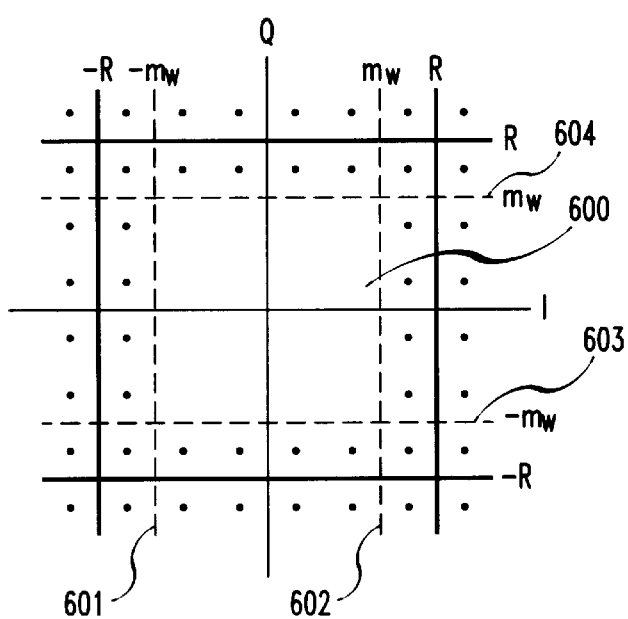
FIG. 21 shows an illustrative partitioning of a signal point constellation using a windowing approach.

In an embodiment of the invention, a receiver implements a windowed MMA (WMMA) approach. In this WMMA approach, a sample window overlays the two-dimensional plane representing the set of equalizer output samples. Only those equalizer output samples appearing within the sample window are used during filter adaptation. An example is shown in FIG. 21, where a sample window is defined by two dotted lines along each dimension—dotted lines 601 and 602 for the in-phase dimension, and dotted lines 603 and 604 for the quadrature phase dimension. These dotted lines form both an exclusion area 600 and a sample window within the signal space. With WMMA, only those samples, $y_{n,w}$, falling within the window, i.e., outside the exclusion area, are used during filter adaptation. This is in contrast to MMA, which uses all of the samples. Thus, the size of the window determines the set of data, $y_{n,w}$, used during filter adaptation, and therefore effects the convergence of the equalizer.

As illustration, two different variations of the windowed MMA approach are described below. The first variation is "Half-Constellation WMMA" and the second variation is "Edge-Point WMMA." For the purposes of these examples, the size of the window is varied as a function of the value of the single parameter $m_w$, which results in a square exclusion area. However, it should be noted that each dotted line could be associated with a different parameter value thus yielding non-square exclusion areas.

Half-Constellation WMMA

Figures 22, 23, 24:
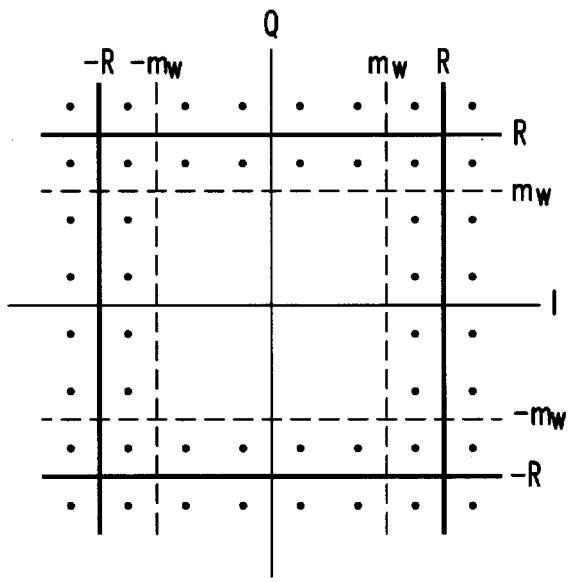
FIG. 22 shows an illustrative partitioning of a signal point constellation using a half-constellation windowing approach.
FIG. 23 shows a table of illustrative data values for use in the half-constellation WMMA approach.
FIG. 24 shows a table of illustrative data values for comparing cost functions.

A half-constellation window is shown in FIG. 22 for a 64-CAP constellation. In the case of the in-phase dimension the samples $y_n$ are divided into two sets by the window boundaries $m_w$ with $|y_n| \leq m_w$ and $|y_{n,w}| > m_w$. With new samples $y_{n,w}$, the cost function CF is redefined as:

$$CF = E[(y_{n,w}^2 - R_w^2)^2]. \qquad (82)$$

Note that the constant R is changed to $R_w$ because the signals $y_{n,w}$ converge to a different constellation with the symbols $a_{n,w}$ where $a_{n,w} = \{\pm 5, \pm 7\}$. The taps of the equalizer are updated with samples $y_{n,w}$ and remain unchanged with samples $|y_n|$. For the half-constellation WMMA, the window boundary $m_w$ is defined as:

$$m_w = m, \qquad (83)$$

where m indicates the number of symbol levels, and the magnitude of the highest symbol level is given by 2m−1. The window boundary $m_w$ is defined in such a way that the same number of inner-point and outer-point symbols $a_n$ are included around the constant R. In other words, the data, $y_{n,w}$, used to update the taps are symmetrically distributed on both sides of R. It is called half-constellation WMMA because the number of partial symbols, $a_{n,w}$, that construct the new constellation is half the number of the original symbols $a_n$. For the half-constellation WMMA, the constant $R_w$ needs to be evaluated with respect to symbols $a_{n,w}$. With the samples, $y_{n,w}$ the cost function $CF_w$ now converges to symbols $a_{n,w}$:

$$CF = E[(y_{n,w}^2 - R_w^2)^2] \rightarrow CF = E[(a_{n,w}^2 - R_w^2)^2]. \qquad (84)$$

Then the constant $R_w$ is computed as $$R_w = \frac{E[a_{n,w}^4]}{E[a_{n,w}^2]}. \qquad (85)$$

Note that the initial index of $a_{n,w}$ does not start with one. Therefore, the moments for the symbols $a_{n,w}$ must be capable of derivation with an arbitrary initial index. The following example is for the calculation of $E[a_{n,w}^2]$. The second-order expectation is rewritten as:

$$E[a_{n,w}^2] = \frac{1}{w}\left(\sum_{n=1}^{M} a_n^2 - \sum_{n=1}^{M_w} a_n^2\right). \qquad (86)$$

The parameter w denotes the number of symbol levels required for the constellation including $a_{n,w}$. For the half-constellation WMMA, $$w = \tfrac{1}{2}m. \qquad (87)$$

Equation (87) means that half the number of the original symbol levels m is required. The parameter M denotes the number of the largest symbol levels and the parameter $M_w$ denotes the number of symbol levels below the window boundary $m_w$. The parameters are given by:

$$M = 2m-1 \text{ and } M_w = m-1. \qquad (88)$$

The constant $R_w$ is then calculated as:

$$R_w^2 = \frac{E[a_{n,w}^4]}{E[a_{n,w}^2]} \tag{89a}$$

$$= \frac{\frac{1}{w}\left[\sum_{n=1}^{M} a_n^4 - \left[\sum_{n=1}^{M_w} a_n^4\right]\right]}{\frac{1}{w}\left[\sum_{n=1}^{M} a_n^2 - \left[\sum_{n=1}^{M_w} a_n^2\right]\right]} \tag{89b}$$

$$= \frac{\frac{2}{m}\left[\sum_{n=1}^{m} a_n^4 - \left[\sum_{n=1}^{w} a_n^4\right]\right]}{\frac{2}{m}\left[\sum_{n=1}^{m} a_n^2 - \left[\sum_{n=1}^{w} a_n^2\right]\right]} \tag{89c}$$

$$= \frac{\frac{m}{15}(48m^4 - 40m^2 + 7) - \frac{m}{30}(3m^4 - 10m^2 + 7)}{\frac{m}{3}(4m^2 - 1) - \frac{m}{6}(m^2 - 1)} \tag{89d}$$

$$= \frac{m\left(\frac{31}{10}m^4 - \frac{7}{3}m^2 + \frac{7}{30}\right)}{\frac{m}{6}(7m^2 - 1)} \tag{89e}$$

$$= \frac{93m^4 - 70m^2 + 7}{35m^2 - 5}. \tag{89f}$$

Values of the constant R for MMA and the constant $R_w$ for WMMA are provided in the Table shown in FIG. 23. It can be observed from the Table of FIG. 23 that the values of $R_w$ are always larger than those of R.

Next, the residual values of the cost function for the half-constellation WMMA are computed to show how much reduction can be obtained. From equation (74e):

$$CF_{a,n} = R^4 - E[a_n^4] \rightarrow CF_{an} = R_w^4 - E[a_{n,w}^4]. \tag{90}$$

Replacing $R_w^2$ with:

$$R_w^2 = \frac{93m^4 - 70m^2 + 7}{35m^2 - 5}, \tag{91}$$

and replacing $E[a_{n,w}^4]$ with:

$$E[a_{n,w}^4] = \frac{2(93m^4 - 70m^2 + 7)}{m}, \tag{92}$$

the cost function $CF_{a,n}$ for the half-constellation WMMA is then obtained as $$CF_{a,n} = R_w^4 - E\left[(a_{n,w}^2 - R_w^2)^2\right] \tag{93a}$$

$$= R_w^4 - E[a_{n,w}^4] \tag{93b}$$

$$= \frac{(93m^4 - 70m^2 + 7)^2}{(35m^2 - 5)^2} - 2 * \frac{93m^4 - 70m^2 + 7}{m} \tag{93c}$$

$$= \frac{2}{75} * \frac{(93m^4 - 70m^2 + 7)(m+2)(m-2)(17m^2 - 2)}{7m^2 - 1}. \tag{93d}$$

A comparison of residual values of cost functions for MMA and half-constellation WMMA is provided in the Table shown in FIG. 24. This table shows that the cost function for 16-CAP becomes zero, and that a reduction of about 5 dB can be obtained for other CAP systems. Thus, by using WMMA, the cost function $CF_{a,n}$ becomes optimum for 16-CAP. For other CAP systems, the cost function $CF_{a,n}$ is reduced. Reduction of the residual values of the cost function $CF_{a,n}$ leads to improved reliability and convergence rate of blind equalizers.

Edge-Point WMMA

Figure 25:
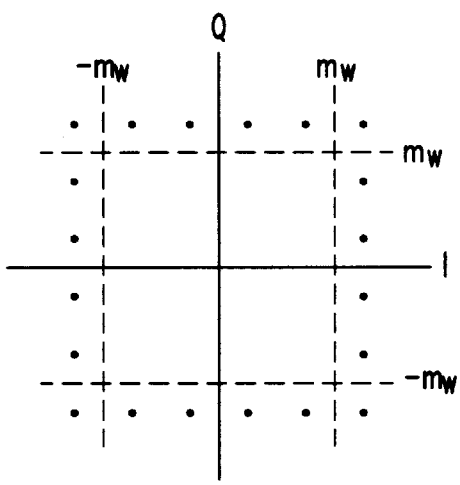
FIG. 25 shows an illustrative partitioning of a signal point constellation using an edge-point constellation windowing approach.

Edge-point WMMA is proposed as the second application of WMMA. The cost function for half-constellation WMMA in equation (81) can be directly applied to edge-point WMMA, except that a modification is made for the sample window parameters. The window parameters are illustrated in FIG. 25, where the window boundary $m_w$ is defined as:

$$m_w = 2(m-1). \tag{94}$$

With such a definition, the symbols $a_{n,w}$ are given by $a_{2m-1}$. The symbols used for filter adaptation are only those that have the largest values. FIG. 25 shows that these symbols are geometrically located at the edge of the original constellation. Because only one symbol level is involved, the calculation of $R_w$ is simply given by:

$$R_w = a_{n,w} = 2m-1. \tag{95}$$

The above equation yields the following equality:

$$R_w^2 = E[a_{n,w}^2]. \tag{96}$$

Equation (96) further leads to the result:

$$CF_{a,w} = E[(a_{n,w}^2 - R_w^2)^2] \rightarrow 0. \tag{97}$$

Equation (97) shows that zero value can be achieved with such a cost function. That is, with edge-point WMMA, the cost function becomes optimum for any CAP system.

The edge-point and half-constellation MMA are basically the same except that they use different window parameters. However, the difference in parameters results in different performance. Theoretically, optimum convergence can only be achieved for 16-CAP with half-constellation WMMA, and can be achieved for any CAP application with edge-point WMMA under conditions to be discussed later.

The design parameters of the edge-point constellation are simple and easy to implement. However, expected performance cannot be achieved for high level CAP applications because other factors also affect convergence, such as the lack of enough data samples $y_n$.

Filter Adaptation

This section describes the algorithms for updating the tap coefficients for the Half-Constellation WMMA and the Edge-Point WMMA approaches. For simplicity, the previous analysis for WMMA was only given for the in-phase dimension. The complete two-dimensional cost function for WMMA is given by:

$$CF = [(y_{n,w}^2 - R_w^2)^2 + (\tilde{y}_{n,w}^2 - R_w^2)^2]. \tag{98}$$

The cost functions can be applied to both half-constellation and edge-point WMMAs by using different definitions for $y_{n,w}$, as described above. The gradients of the cost function in equation (98) with respect to the tap vectors $c_n$ and $d_n$ are equal to:

$$\nabla_c = (y_{n,w}^2 - R_w^2) y_{n,w} r_n \quad \nabla_d = (\tilde{y}_{n,w}^2 - R_w^2) \tilde{y}_{n,w} r_n. \tag{99}$$

The taps of the filter are then updated in a stochastic fashion in the opposite direction of the gradient:

$$c_{n+1} = c_n - \mu(y_{n,w}^2 - R_w^2) y_{n,w} r_n, \tag{100}$$

$$d_{n+1} = d_n - \mu(\tilde{y}_{n,w}^2 - R_w^2) \tilde{y}_{n,w} r_n. \tag{101}$$

Note that $y_{n,w}$ and $R_w$ are different for the two versions of WMMA.

In the implementation of the algorithms, the samples $y_{n,w}$ are normally calculated by using a comparator, or a look-up table. Alternatively, a nonlinear function $f(\cdot)$ is proposed to determine partial samples $y_{n,w}$. The function $f(\cdot)$ is defined as:

$$f(y_n) = \tfrac{1}{2}[1+\text{sgn}(y_n^2 - m_m^2)], \text{ and} \quad (102)$$

$$f(\tilde{y}_n) = \tfrac{1}{2}[1+\text{sgn}(\tilde{y}_n^2 - m_m^2)]. \quad (103)$$

So that:

$$f(y_n) = \begin{cases} 0 & \text{if } |y| \leq m_w \\ 1 & \text{otherwise} \end{cases} \quad f(\tilde{y}_n) = \begin{cases} 0 & \text{if } |\tilde{y}| \leq m_w \\ 1 & \text{otherwise} \end{cases} \quad (104)$$

where $m_w = m$ for half-constellation WMMA, and $m_w = 2(m-1)$ for edge-point WMMA. The use of the nonlinear equation $f(\cdot)$ gives the following relation:

$$f(y_n) = y_{n,w}; \text{ and } f(\tilde{y}_n) = \tilde{y}_{n,w}. \quad (105)$$

The cost function CF can be rewritten as:

$$CF = [f(y_n)(y_n^2 - R_w^2)^2 + f(\tilde{y}_n)(\tilde{y}_n^2 - R_w^2)^2]. \quad (106)$$

and the corresponding tap updating algorithm becomes:

$$c_{n+1} = c_n - \mu f(y_n)(y_n^2 - R_w^2)y_n r_n, \text{ and} \quad (107)$$

$$d_{n+1} = d_n - \mu f(\tilde{y}_n)(\tilde{y}_n^2 - R_w^2)\tilde{y}_n r_n. \quad (108)$$

In the case of the in-phase dimension, both equations (100) and (107) can be used to do filter adaptation.

Figure 26:
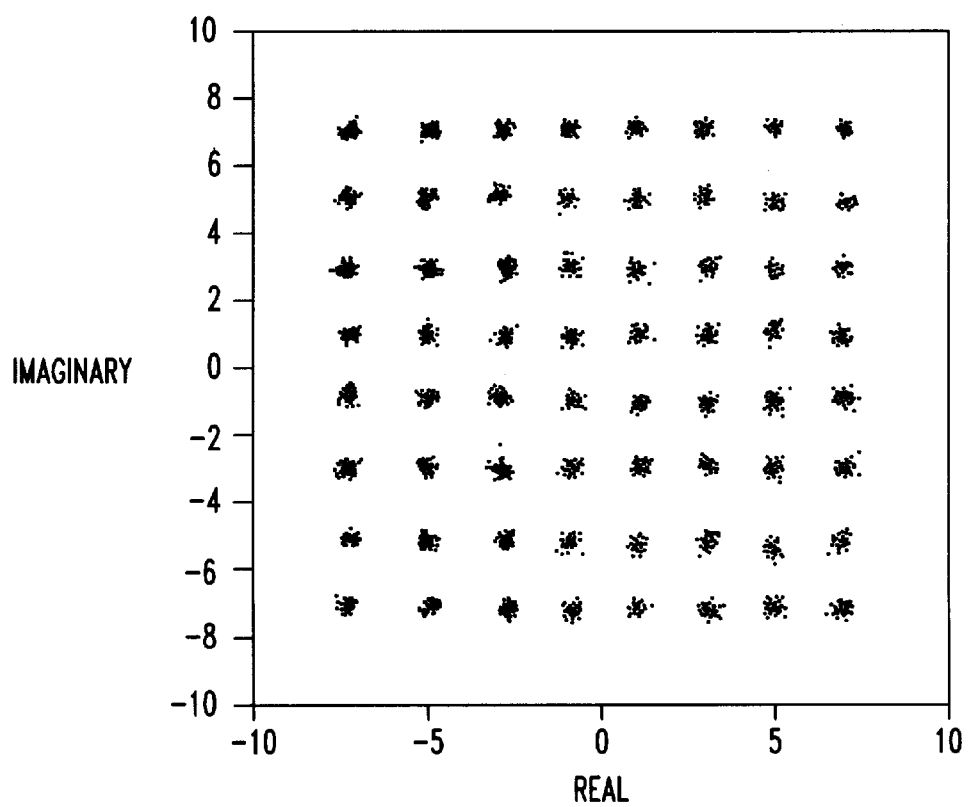
FIG. 26 is an illustrative signal point plot of an output signal of an equalizer using an LMS algorithm.
Figure 27:
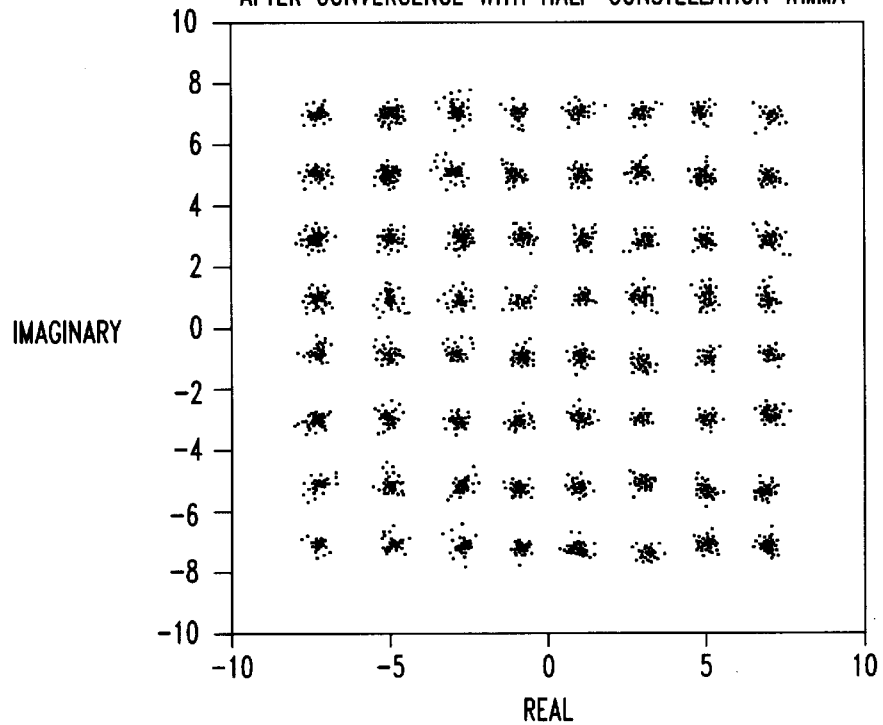
FIGS. 27–28 are illustrative signal point plots of an output signal of an equalizer using a Half-Constellation WMMA algorithm and Edge-Point WMMA algorithm, respectively.
Figure 28:
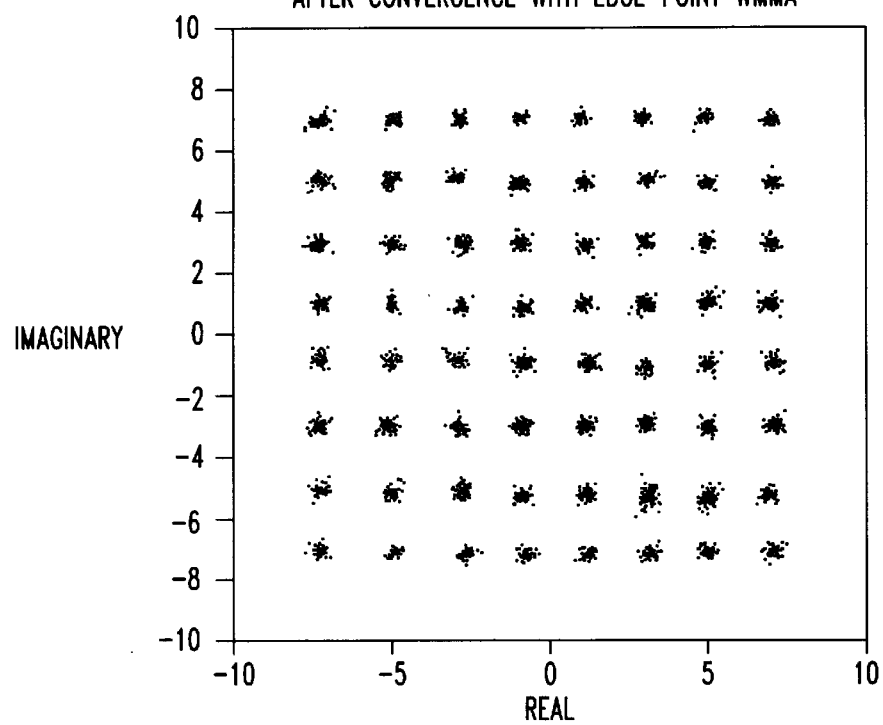

FIGS. 16, and 26–28, show illustrative plots of converged signal constellations for the various algorithms based on computer simulation. FIG. 16 shows the signal constellation after converging with MMA, and FIG. 26 shows the signal constellation after converging with LMS. These two figures together show that even though initial convergence can be achieved with blind algorithms, the LMS algorithm is needed to obtain optimal convergence. FIG. 27 shows the converged constellation with the half-constellation WMMA, whereas FIG. 28 shows the converged constellation with the edge-point WMMA. From FIGS. 27 and 28, it can be observed that the convergence performance is improved by using the half-constellation WMMA, and is further improved by using the edge-point WMMA. In fact, a comparison of FIGS. 26 and 28 shows that almost the same convergence performance is achieved by using the edge-point WMMA and the LMS algorithm. It should be noted that in this example the step size used in the edge-point WMMA is about five times larger than for the other algorithms. A step size of $\mu = 0.00001$ is used for MMA.

It is recommended that the use of windowed MMA be limited to applications with a limited number of symbol levels. For very large constellation, a good performance may be difficult to obtain because of the lack of sufficient equalizer output samples during filter adaptation.

Figure 11:
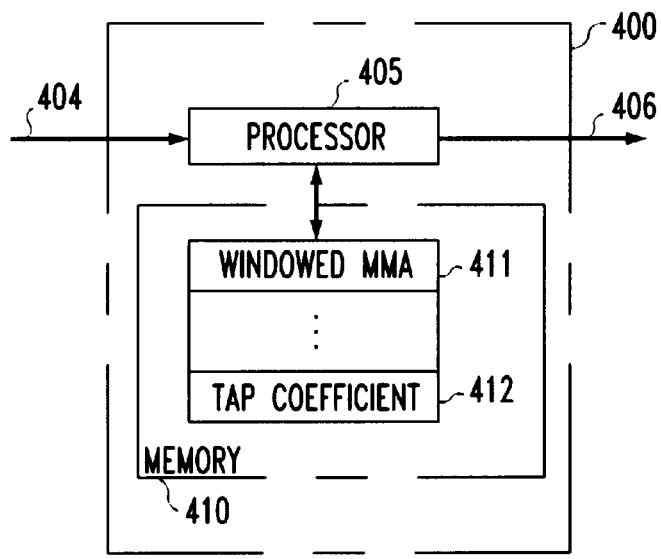
FIGS. 11 and 12 are illustrative block diagrams of a portion of a receiver embodying the principles of the invention.
Figure 12:
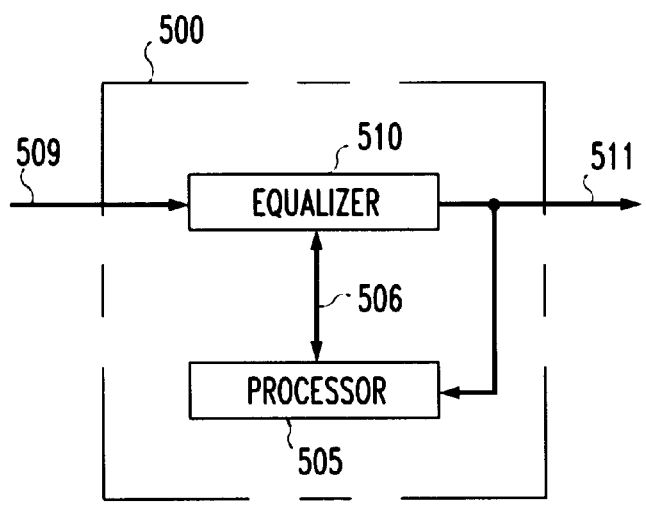

Illustrative embodiments of the inventive concept are shown in FIGS. 11 and 12. FIG. 11 illustrates an embodiment representative of a digital signal processor 400 that is programmed to implement an FSLE in accordance with the principles of the invention. Digital signal processor 400 comprises a central processing unit (processor) 405 and memory 410. A portion of memory 410 is used to store program instructions that, when executed by processor 405, implement the windowed-MMA type algorithm. This portion of memory is shown as 411. Another portion of memory, 412, is used to store tap coefficient values that are updated by processor 405 in accordance with the inventive concept. It is assumed that a received signal 404 is applied to processor 405, which equalizes this signal in accordance with the inventive concept to provide a output signal 406. For the purposes of example only, it is assumed that output signal 406 represents a sequence of output samples of an equalizer. (As known in the art, a digital signal processor may, additionally, further process received signal 404 before deriving output signal 406.) An illustrative software program is not described herein since, after learning of the windowed-MMA type algorithms as described herein, such a program is within the capability of one skilled in the art. Also, it should be noted that any equalizer structures, such as those described earlier, can be implemented by digital signal processor 400 in accordance with the inventive concept.

FIG. 12 illustrates another alternative embodiment of the inventive concept. Circuitry 500 comprises a central processing unit (processor) 505, and an equalizer 510. The latter is illustratively assumed to be a phase-splitting FSLE as described above. It is assumed that equalizer 510 includes at least one tap-coefficient register for storing values for corresponding tap coefficient vectors (e.g., as shown in FIG. 3). Processor 505 includes memory, not shown, similar to memory 410 of FIG. 11 for implementing the windowed-MMA type algorithms. Equalizer output signal 511, which represents a sequence of equalizer output samples, is applied to processor 505. The latter analyzes equalizer output signal 511, in accordance with the inventive concept, to adapt values of the tap coefficients in such a way as to converge to a correct solution.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the invention is illustrated herein as being implemented with discrete functional building blocks, e.g., an equalizer, etc., the functions of any one or more of those building blocks can be carried out using one or more appropriate programmed processors.

In addition, although the inventive concept was described in the context of an FSLE, the inventive concept is applicable to other forms of adaptive filters, such as, but not limited to, a decision feedback equalizer (DFE). The inventive concept is applicable to all forms of communications systems, e.g., broadcast networks, e.g., high-definition television (HDTV), point-to-multipoint Networks like fiber to the curb (mentioned above), signal identification, or classification, applications like wire-tapping, etc.

Also, although the inventive concept was described in the context of a modified MMA algorithm, the inventive concept is applicable to other forms of equalization.

What is claimed is:

1. An improved method for performing equalization in a receiver, the improvement comprising:
   using a subset of output samples from an equalizer for converging the equalizer in such a way that slicing is not performed on the subset of the output sample and wherein the using step includes the steps of:
      partitioning a signal point space into an exclusion region and a sample window region; and
      using that subset of output samples from the equalizer that fall within the sample window for converging the equalizer.

2. The method of claim 1 wherein the partitioning step includes the step of selecting the exclusion region and the sample window region such that along one dimension of the signal point space a number of symbols within the sample window region is equal to one half of a number of symbols in that dimension.

3. The method of claim 1 wherein the partitioning step includes the step of selecting the exclusion region and the sample window region such that the sample window region only includes outer-most symbols of the signal point space.

4. An improved method for performing equalization in a receiver, the improvement comprising:

using a subset of output samples from an equalizer for converging the equalizer in such a way that slicing is not performed on the subset of the output sample and wherein the using step includes the step of:

adapting a set of tap coefficients of the equalizer in accordance with a multimodulus-based blind equalization technique operative on the subset of output samples.

5. An improved method for performing equalization in a receiver, the improvement comprising:

using a subset of output samples from an equalizer for converging the equalizer in such a way that slicing is not performed on the subset of the output sample and wherein the using step includes the step of:

adapting a set of tap coefficients of the equalizer in accordance with a constant modulus-based blind equalization technique operative on the subset of output samples.

6. An improved equalizer for use in a receiver for performing equalization; the improvement comprising:

a processor that adapts coefficients of the equalizer by using a subset of output samples from the equalizer in such a way that slicing is not performed on the subset of the output samples wherein the output samples have associated coordinate values within a signal point space and the subset of output samples are those output samples having coordinate values outside of an exclusion region of the signal point space.

7. The apparatus of claim 6 wherein the processor is a digital signal processor.

8. The apparatus of claim 6 wherein the processor adapts the coefficients of the equalizer in accordance with a blind equalization algorithm.

9. The apparatus of claim 8 wherein the blind equalization algorithm is based upon a constant modulus algorithm.

10. The apparatus of claim 8 wherein the blind equalization algorithm is based upon a mulitmodulus algorithm.

11. An improved equalizer for use in a receiver for performing equalization; the improvement comprising:

a processor a) for providing an equalizer function for equalizing a received signal, and b) for adapting coefficients of the equalizer function by using a subset of output samples that represent the equalized received signal in such a way that slicing is not performed on the subset of the output samples wherein the output samples have associated coordinate values within a signal point space and the subset of output samples are those output samples having coordinate values outside of an exclusion region of the signal point space.

12. The apparatus of claim 11 wherein the processor is a digital signal processor.

13. The apparatus of claim 11 wherein the processor adapts the coefficients of the equalizer in accordance with a form of blind equalization algorithm.

14. Apparatus for use in a receiver, the apparatus comprising:

an equalizer having a set of tap coefficient values and for providing an equalized version of an applied input signal represented by a plurality of output samples; and a processor for adapting the set of tap coefficients as a function of a subset of the plurality of output samples in such a way that slicing is not performed on the subset of the plurality of output samples wherein the plurality of output samples have associated coordinate values within a signal point space and the subset of output samples are those output samples having coordinate values outside of an exclusion region of the signal point space.

15. The apparatus of claim 14 wherein the exclusion region is such that along one dimension of the signal point space a number of symbols within the exclusion region is equal to one half of a number of symbols in that dimension.

16. The apparatus of claim 14 wherein the exclusion region does not include outer-most symbols of the signal point space.

17. Apparatus for use in a receiver, the apparatus comprising:

an equalizer having a set of tap coefficient values and for providing an equalized version of an applied input signal represented by a plurality of output samples; and a processor for adapting the set of tap coefficients as a function of a subset of the plurality of output samples in such a way that slicing is not performed on the subset of the plurality of output samples wherein the form of blind equalization algorithm is a mulitmodulus-based algorithm.

* * * * *